(12) United States Patent
Kobayashi et al.

(10) Patent No.: US 6,451,401 B1
(45) Date of Patent: *Sep. 17, 2002

(54) INFORMATION RECORDING MEDIUM AND METHOD OF MANUFACTURING RESINOUS SUBSTRATE FOR USE IN THE RECORDING MEDIUM

(75) Inventors: Tadashi Kobayashi, Chiba; Hisashi Yamada, Yokohama, both of (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 82 days.

This patent is subject to a terminal disclaimer.

(21) Appl. No.: 09/658,591

(22) Filed: Sep. 8, 2000

Related U.S. Application Data

(62) Division of application No. 09/283,161, filed on Apr. 1, 1999, now Pat. No. 6,159,572.

(30) Foreign Application Priority Data

Apr. 3, 1998 (JP) .......................................... 10-091422

(51) Int. Cl.⁷ ................................................ B32B 3/02
(52) U.S. Cl. ...................... 428/64.1; 428/64.4; 428/457
(58) Field of Search ............................... 428/64.1, 64.4, 428/457, 913; 430/270.12, 495.1, 945

(56) References Cited

U.S. PATENT DOCUMENTS

| | | | |
|---|---|---|---|
| 5,604,003 A | 2/1997 | Coombs | 428/64.1 |
| 5,702,792 A | 12/1997 | Iida | 428/64.1 |
| 5,757,733 A | 5/1998 | Gardner et al. | |
| 5,972,459 A | 10/1999 | Kawakubo | 428/64.1 |
| 5,972,461 A | 10/1999 | Sandstrom | 428/64.3 |
| 6,159,572 A | * 12/2000 | Kobayashi | 428/64.1 |

FOREIGN PATENT DOCUMENTS

| | | |
|---|---|---|
| JP | 9-204686 | 8/1997 |
| JP | 9-204688 | 8/1997 |

* cited by examiner

*Primary Examiner*—Elizabeth Mulvaney
(74) *Attorney, Agent, or Firm*—Pillsbury Winthrop LLP

(57) ABSTRACT

An information recording medium comprising a substrate having a recording surface provided with emboss pits or guiding grooves, a reflective film formed on the recording surface of the substrate, and a first protective film formed on the reflective film. This information recording medium is featured in that both sides of the information recording medium are constituted by a first surface provided with the protective film and by a second surface formed opposite to the first surface, and that an irradiated light beam is irradiated through the first surface, a recorded information being reproduced based on changes in light intensity of the reflected light beam. The distance between the recording surface of the substrate and the light incident surface is smaller than a thickness of the substrate, and a surface roughness "R" of the light incident surface meets a relationship represented by the following formula (1):

$$R \leq \lambda/(8n) \tag{1}$$

wherein λ is a wavelength of the light beam, and n is a refractive index of the first protective film to a light having the wavelength λ.

8 Claims, 10 Drawing Sheets

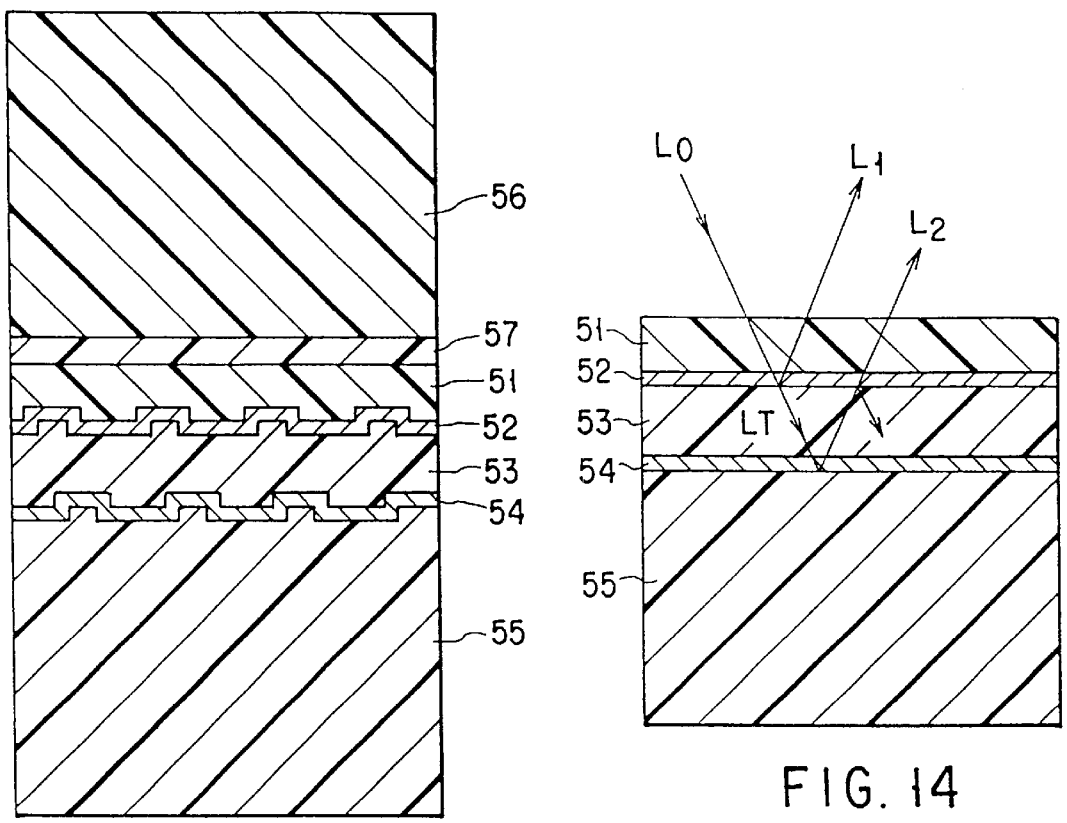
FIG. 13
FIG. 14
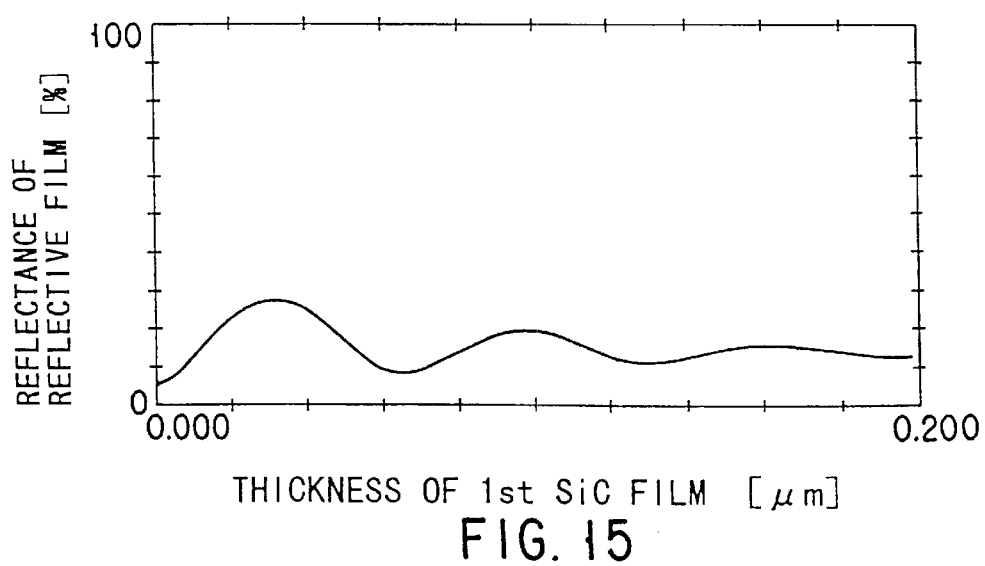
FIG. 15

INFORMATION RECORDING MEDIUM AND METHOD OF MANUFACTURING RESINOUS SUBSTRATE FOR USE IN THE RECORDING MEDIUM

This is a division of Application Ser. No. 09/283,161, filed Apr. 1, 1999 now U.S. Pat. No. 6,159,572 issued Dec. 12, 2000.

BACKGROUND OF THE INVENTION

This invention relates to an information recording medium and to a method of manufacturing a resinous substrate to be employed for the information recording medium. In particular, this invention relates to a surface recording/reproducing type information recording medium and to a method of manufacturing a resinous substrate to be employed for such an information recording medium.

An ordinary optical disk such as CD, CD-ROM, etc. is constructed such that emboss pits are formed in conformity with the recorded data on one of the surfaces of a transparent substrate having a thickness of 1.2 mm, the emboss pits being covered thereon by a reflective film made of Al for example. The information recorded in the CD constructed in this manner can be reproduced by irradiating a converging beam onto the emboss pits from a surface of the transparent substrate which is opposite to the other surface where the reflective film is formed.

On the other hand, an optical disk such as DVD, DVD-ROM where the recording density is highly enhanced is construct ed such that finer emboss pits than those of the CD are formed on one of the surfaces of a transparent substrate having a thickness of 0.6 mm, the emboss pits being also covered thereon by a reflective film made of Al for example. The information recorded on the recording surface of the disk constructed in this manner can be reproduced in the same manner as that of the CD, i.e. by irradiating a converging beam onto the emboss pits from a surface of the transparent substrate which is opposite to the other surface where the reflective film is formed.

As for the material for the substrate having a thickness of 0.6 mm, PC (polycarbonate) which is a transparent resin is generally employed. This PC substrate having a thickness of 0.6 mm however is not sufficient in mechanical property, resulting in the warping of the substrate as it is employed singly. Therefore, in order to prevent the substrate from being warped, a couple of PC substrates each having a thickness of 0.6 mm are superimposed each other with the recording surface being directed inside, thus forming a disk having a total thickness of 1.2 mm, thereby ensuring the mechanical property thereof.

The reason for setting the substrate of DVD to 0.6 mm is to secure the tilt margin of the disk. When the density of track pitch or pit is increased, the margin of the inclination or so-called tilt of the disk is caused to decrease. Although it may be possible to secure the tilt margin by decreasing the thickness of the substrate from 1.2 mm to 0.6 mm, it will inevitably result in a deterioration of the mechanical property thereof.

Under the circumstances, there has been proposed, with a view to secure the mechanical strength of the disk while decreasing the thickness of the substrate, an idea of thickening the central portion of the disk thereby to ensure the mechanical strength thereof (Japanese Patent Unexamined Publication H9-204686). However, it is required, for ensuring a sufficient mechanical strength, to make the thickness of the signal recording region of the substrate at least 0.6 mm.

Further, there is also reported an idea of making the thickness of the substrate to range from 0.1 mm to 0.6 mm (Japanese Patent Unexamined Publication H9-204688). However, the thickness of a protective substrate for sustaining the recording film as well as the film thickness of the reflective film are not referred to in the idea, thus making it difficult to practice in the actual application thereof.

U.S. Pat. No. 5,757,733 teaches an information recording medium comprising a covering layer formed on the light beam incident side, and a flat substrate sustaining a recording film. However, this covering layer is simply referred to as having a thickness of 0.6 to 1.0 mm.

For the purpose of further increasing the capacity of the disk by compacting the recording density, it is more effective, in view of assuring the tilt margin, to make the thickness of the substrate as thin as possible. However, when the thickness of the substrate becomes less than 0.6 mm, it becomes difficult to secure the mechanical strength thereof even if a couple of substrates are superimposed each other.

Moreover, this superimposition of a couple of substrates is accompanied with the problems that it not only requires the employment of an adhesive but also makes the manufacturing process thereof more complicated.

BRIEF SUMMARY OF THE INVENTION

Therefore, the object of the present invention is to provide an information recording medium which is capable of securing a sufficient tilt margin and a sufficient mechanical strength even if the recording density is further increased.

Another object of the present invention is to provide a method of manufacturing a resinous substrate which is adapted to be employed for such an information recording medium.

Namely, according to this invention, there is provided an information recording medium, which comprises a substrate having a recording surface provided with emboss pits or guiding grooves; a reflective film formed on the recording surface of the substrate; and a first protective film formed on the reflective film;

wherein both sides of the information recording medium are constituted by a first surface constituting an uppermost surface on the first protective film and by a second surface formed opposite to the first surface;

the first surface is constituted as a light incident surface, thereby allowing an irradiated light beam to enter and reflect through the first surface, a recorded information being reproduced based on changes in light intensity of the reflected light beam; and wherein a distance between the recording surface of the substrate and the light incident surface is smaller than a thickness of the substrate, and a surface roughness "R" of the light incident surface meets a relationship represented by the following formula (1):

$$R \leq \lambda/(8n) \qquad (1)$$

where $\lambda$ is a wavelength of the light beam; and n is a refractive index of the first protective film to a light having the wavelength $\lambda$.

This invention further provides an information recording medium, which comprises;

a substrate having a couple of recording surfaces facing to each other and each provided with emboss pits or guiding grooves;

a couple of reflective films each formed on each of the recording surfaces of the substrate;

a couple of first protective films each formed on each of the reflective film; and a couple of light incident surfaces each constituting an outermost surface;

wherein a light beam to be irradiated is designed to be entered and reflected through the couple of light incident surfaces, a recorded information being reproduced based on changes in light intensity of the reflected light beam;

a distance between one of the light incident surfaces of the information recording medium to the other is not more than 1.2 mm;

a distance between the recording surface of the substrate and the light incident surface formed over the recording surface is smaller than a thickness of the substrate; and wherein a surface roughness "R" of the couple of light incident surfaces meets a relationship represented by the following formula (1):

$$R \leq \lambda/(8n) \tag{1}$$

where $\lambda$ is a wavelength of the light beam; and n is a refractive index of the first protective film to a light having the wavelength $\lambda$.

This invention further provides an information recording medium, which comprises;

a surface substrate having a light incident surface and an emboss pit surface provided with emboss pits and facing the light incident surface;

a first reflective film formed on the emboss pit surface of the surface substrate;

a supporting substrate having an emboss pit surface provided with emboss pits and a substrate surface facing the emboss pit surface;

a second reflective film formed on the emboss pit surface of the supporting substrate; and a transparent adhesive layer bonding the first reflective film and the second reflective film;

wherein a first record surface is constituted by the emboss spit surface of the surface substrate and the first reflective film;

a second record surface is constituted by the emboss spit surface of the supporting substrate and the second reflective film; and wherein a light beam to be irradiated is designed to be entered and reflected through the light incident surface, a recorded information being reproduced based on changes in light intensity of the reflected light beam.

Further, this invention also provides a method of manufacturing a resinous substrate having a first recording surface provided with emboss pits or guiding grooves, and a second recording surface facing the first recording surface and provided with emboss pits or guiding grooves, which comprises the steps of;

mounting a first stamper platen for forming a first recording surface on a first die;

mounting a second stamper platen for forming a second recording surface on a second die;

positioning the first die and second die so as to keep a space therebetween and to arrange the first stamper platen to face the second stamper platen;

filling the space formed between the first die and second die with a heated and fluidized resinous material;

bringing the first die and second die close to each other thereby adjusting an interval between the first die and second die to a predetermined distance; and allowing the resinous material filled between the first die and second die to cool and solidify thereby to obtain a double surface substrate having a thickness of not more than 1.2 mm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a cross-sectional view schematically showing still another example of an information recording medium according to this invention;

FIG. 14 is a schematic view for illustrating the reflectance and the transmittance of the recording surface in a 2-ply optical disk;

FIG. 15 is a graph showing a relationship between the film thickness and reflectance of a reflective film;

DETAILED DESCRIPTION OF THE INVENTION

This invention will be further explained in detail with reference to the examples of this invention.

EXAMPLE 1

Figure 1:
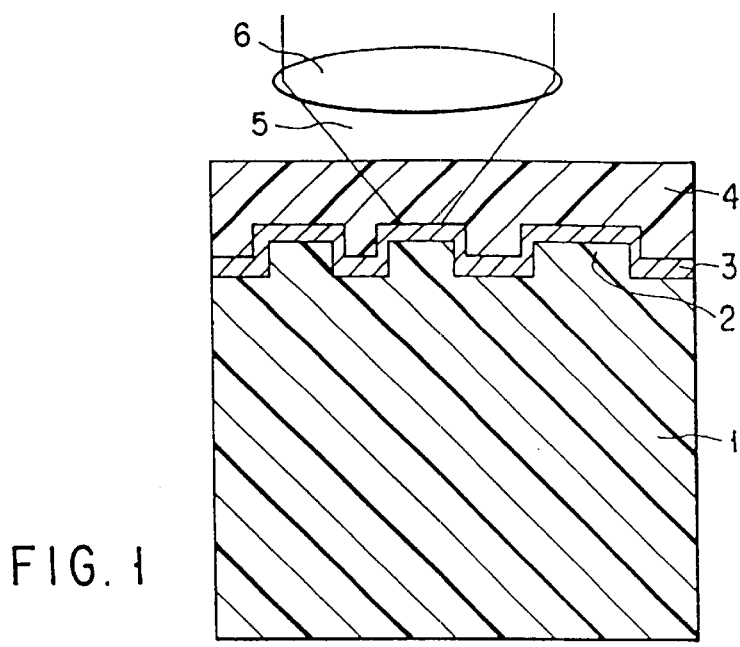
FIG. 1 is a cross-sectional view schematically showing one example of an information recording medium according to this invention.

FIG. 1 is a cross-sectional view schematically showing one example of an optical disk according to this example. In the optical disk shown in FIG. 1, one of the surfaces of a disk substrate 1 having a thickness of 1.2 mm is formed into a recording surface on which emboss pits 2 are formed in conformity with a recorded data. The thickness of the substrate 1 may be suitably selected as long as the thickness in the range of from 0.6 mm to 1.2 mm. The surface of this recording surface provided with the emboss pits 2 is covered with a reflective film 3 and then with an over-coating consisting of a protective film (first protective film) 4. In the case of the optical disk shown in FIG. 1, The surface of the protective film 4 is the light incident surface.

The readout of the recorded data stored in the disk can be performed as follows. Namely, as shown in FIG. 1, a light beam 5 is converged by an objective lens 6 and then enters through the protective film 4. The light beam is then reflected by the reflective film 3, thus producing a light reflection accompanying changes in light intensity, which are then detected as the recorded data of the emboss pits.

According to the conventional optical disk, light beam enters not from the protective film side but from the transparent substrate side, and is reflected by the emboss formed on the surface opposite to the light incident surface of the substrate, thus enabling the emboss data to be read. By contrast, in the case of the optical disk having a structure as shown in FIG. 1 however, since the data is to be reproduced from the embossed surface formed on the surface of the substrate, the film thickness of the protective film 4 can be considered as corresponding to the thickness of the substrate according to the conventional optical disk.

According to the optical disk of this invention, the distance from the embossed surface (recording surface) to the light incident surface is defined as being smaller than the thickness of the substrate 1, the thickness of the protective film 4 is naturally smaller than the thickness of the substrate. Therefore, the optical disk of this invention will be hardly influenced by the restriction due to the thickness of the substrate on the tilt margin, thus making it easy to increase the recording density.

According to the information recording medium of this invention, the surface roughness "R" of the surface to which a light beam is to be irradiated, i.e. the light incident surface is defined so as to meet a relationship represented by the following formula (1):

$$R \leq \lambda/(8n) \tag{1}$$

wherein $\lambda$ is a wavelength of the light beam; and n is a refractive index of the protective film to a light having the wavelength $\lambda$.

It becomes possible, by limiting the surface roughness of the light incident surface as described above thereby ensuring the flatness of the light incident surface, to minimize the light-diffracting phenomenon at the light incident surface. Additionally, if the surface of the optical disk is flat as defined above, dust can be hardly attached to the surface of the optical disk, thus improving a dust adhesion preventive effect of the optical disk. Moreover, if the surface of the optical disk is flat as defined above, it is also possible to obtain the effect that the optical disk can be prevented from being contacted with the objective lens. By the way, more preferable surface roughness of the light incident surface is not higher than a half of $\lambda/(8n)$, i.e. not higher than $\lambda/(16n)$.

It is possible, according to the information recording medium of this invention, to further include a second protective film which is to be formed on the first protective film as mentioned hereinafter. In any case, the outermost surface from which a light beam is to be irradiated becomes the light incident surface in the information recording medium of this invention. For example, when this second protective film is formed on the surface of the first protective film, the surface of the second protective film becomes the light incident surface. It is also required in this case that the surface roughness R of the light incident surface constituted by the second protective film should meet the relationship represented by the aforementioned formula (1). Further, in this case also, it is an indispensable requirement for the information recording medium of this invention that the distance from the recording surface to the light incident surface should be smaller than the thickness of the substrate.

The embossing of the recording surface of the disk substrate is formed with a size of about $\lambda/(8n)$ in relative to the wavelength $\lambda$ of a light beam to be employed for the reproduction of a recorded data (wherein n is a refractive index of the surface protective film to a light having the aforementioned wavelength $\lambda$). The distance from the recording surface of the disk substrate to the surface to be irradiated (light incident surface) should preferably be at least 10 times higher than the magnitude of the embossing in view of the smoothing of the light incident surface. Accordingly, the distance from the recording surface of the disk substrate to the light incident surface should preferably be $5\lambda/(4n)$. Further, in view of shortening the wavelength of the light beam and a tilt margin involved in highly enhancing the NA of the objective lens, the distance from the recording surface of the disk substrate to the light incident surface should preferably be 0.1 mm or less.

The optical disk shown in FIG. 1 can be manufactured as follows. First of all, the reflective film 3 is formed on the recording surface of the disk substrate 1. In this case, the reflective film 3 can be deposited on the recording surface of the disk substrate 1 by the vapor deposition or sputtering of a material for the reflective film.

The protective film 4 to be placed on the surface of this reflective film 3 can be formed by making use of a conventional ultraviolet-curing resin for instance. Namely, the protective film 4 is at first coated on the surface of the reflective film 3 by means of a spin coating method for instance thereby to form a resin film, and then irradiated with ultraviolet rays thereby to cure the resin film, thus forming the protective film 4. The thickness of this over-coating protective film 4 may be in the range of from several microns to several millimeters in practical view point. More preferably, the thickness of this over-coating protective film 4 should be not more than 0.6 mm, most preferably in the range of 0.0001 to 0.1 mm. Additionally, the thickness of the protective film 4 should preferably be such that does not optically interfere with the reflective film 3.

As for the material for the protective film 4, it is not restricted to ultraviolet-curing resins, but may be any material as long as it is capable of allowing a light beam for the reproduction of data to be transmitted therethrough and is stable environmentally and thermally. For example, the protective film 4 may be constituted by a dielectric material. More specifically, the protective film 4 may be formed by means of a vacuum deposition method or a sputtering method employing $SiO_2$, SiO, AlN, $Al_2O_3$, $ZrO_2$, $TiO_2$, $Ta_2O_3$, ZnS, Si, Ge or a mixture thereof.

This protective film 4 may be omitted provided that the reflective film 3 per se is formed of a stable film.

The disk substrate 1 having a thickness of 1.2 mm and being useful for the manufacture of the optical disk of this example can be manufactured by means of an injection molding method which is commonly employed for the manufacture of the conventional CD and DVD. For example, a master platen in which information is stored in advance is mounted on one of the dies of an injection molding machine, and then an injection molding is performed after adjusting the space between a couple of dies in such a way that the thickness of the substrate after the molding thereof becomes 1.2 mm, thus manufacturing a disk substrate having a thickness of 1.2 mm.

As mentioned above, according to the conventional optical disk, since recorded data is designed to be reproduced by irradiating a light beam from the substrate side, the substrate is required to have a capability of permitting a light beam for the reproduction of data to transmit therethrough. Whereas, according to the optical disk of this invention, since recorded data is designed to be reproduced by irradiating a light beam from the protective film side, the substrate is not necessarily required to be transparent. Since the light beam is irradiated from the protective film side as mentioned above, the problem of birefringence of the substrate can be disregarded. Therefore, there is not any particular limitation as to the material of the substrate as long as the material is excellent in environmental resistance, heat resistance and workability. For example, materials such as ABS resin, polyethylene resin, polystyrene resin, etc. which are inexpensive as compared with the materials employed conventionally can be employed.

Figure 2:
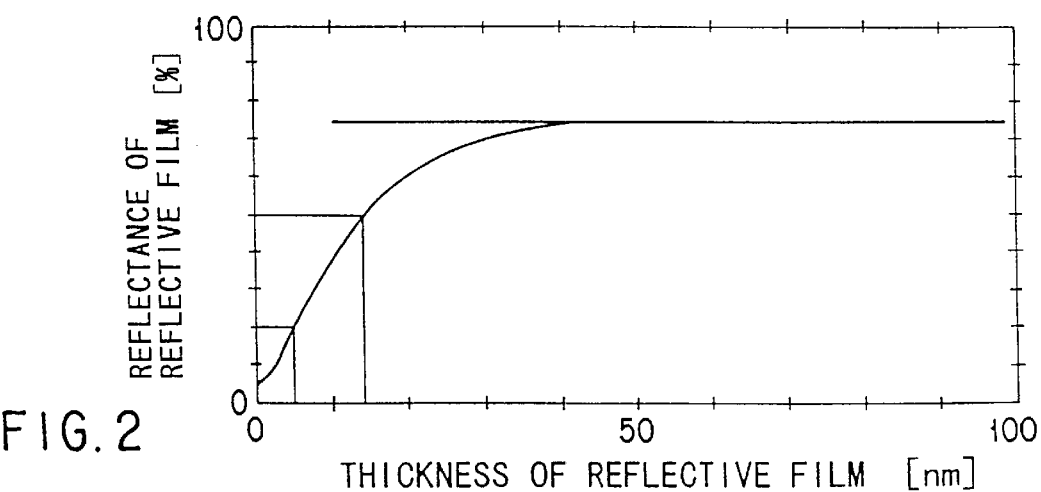
FIG. 2 is a graph showing a relationship between the film thickness and reflectance of a reflective film.

FIG. 2 shows a graph illustrating a relationship between the film thickness and reflectance of the reflective film of the optical recording medium shown in FIG. 1.

By the way, the reflective film in this example was formed using an Al-based alloy film, and the wavelength of the light beam to be irradiated was set to 650 nm. The graph of FIG. 2 shows that under this condition, when the film thickness of the reflective film 3 is set to about 14 nm, the reflectance becomes 45%, while when the film thickness of the reflective film 3 is set to about 40 nm, the reflectance becomes almost saturated. The reflectance represented by the curve shown in this graph includes also a surface reflection from the surface of the protective film 4. Accordingly, the reflectance at the surface of the reflective film can be obtained by subtracting the surface reflection from the reflectance shown in this graph. Specifically, since the reflectance when the thickness of the reflective film is zero corresponds to the surface reflection of the protective film 4, the reflectance of the reflective film can be obtained by subtracting the value (about 5%) of the reflectance when the thickness of the reflective film is zero from the reflectance shown in this graph in the case of the curve shown in FIG. 2.

Figure 3:
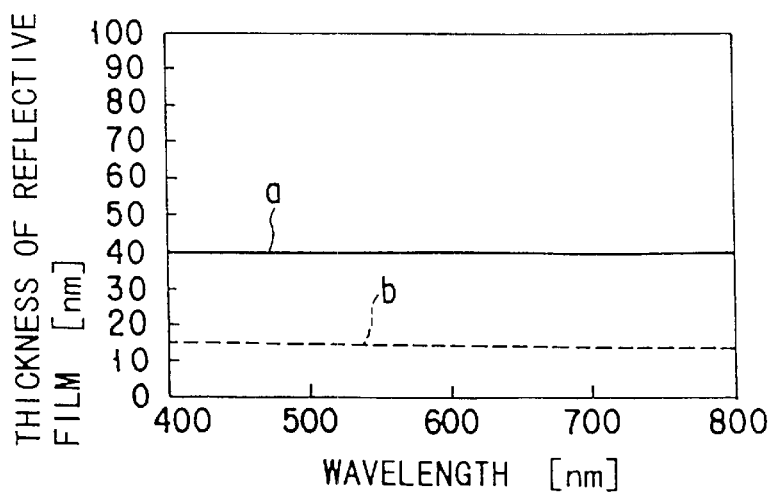
FIG. 3 is a graph illustrating the dependency of the film thickness of a reflective film on the light wavelength.

FIG. 3 illustrates the dependency of the film thickness of a reflective film on the light wavelength when the reflectance becomes 45% or saturated. By the way, the reflective film in this example was formed using an Al-based alloy film, and the wavelength of the light beam was set to 400 to 800 nm.

In the graph shown in FIG. 3, the line "a" indicates a film thickness where the reflectance becomes 45%, while the line "b" indicates a film thickness where the reflectance becomes saturated. As shown in this graph, the dependency of the film thickness of the reflective film on the light wavelength within the range of 400 to 800 nm is relatively small. Further, within this range of wavelength, the film thickness of the reflective film giving a reflectance of 45% was in the range of 13 to 14 nm, while the film thickness of the reflective film giving a saturated reflectance was about 40 nm.

Since the reflectance is set to 45 to 85% according to the specification of DVD-ROM, the reflectance of the reflective film of the optical disk according to this invention is required to be 45% or more thereby making it possible to secure the compatibility with DVD-ROM in the reproduction of data. The graph shown in FIG. 3 indicates that for the realization of this reflectance, the film thickness of the reflective film is required to set to 14 nm or more. Further, for the purpose of securing a fixed reflectance by suppressing the fluctuation in film thickness of the reflective film, it is preferable to set the reflective film to a film thickness where the reflectance thereof is saturated. For this purpose, the film thickness of the reflective film should preferably be set to 40 nm or more.

The reflective film consisting of the Al-based alloy film and manufactured as mentioned above is minimal in light wavelength dependency, so that it is possible to apply the reflective film with this magnitude of film thickness to the reproduction of data using a green or blue light beam in future.

EXAMPLE 2

Figure 4:
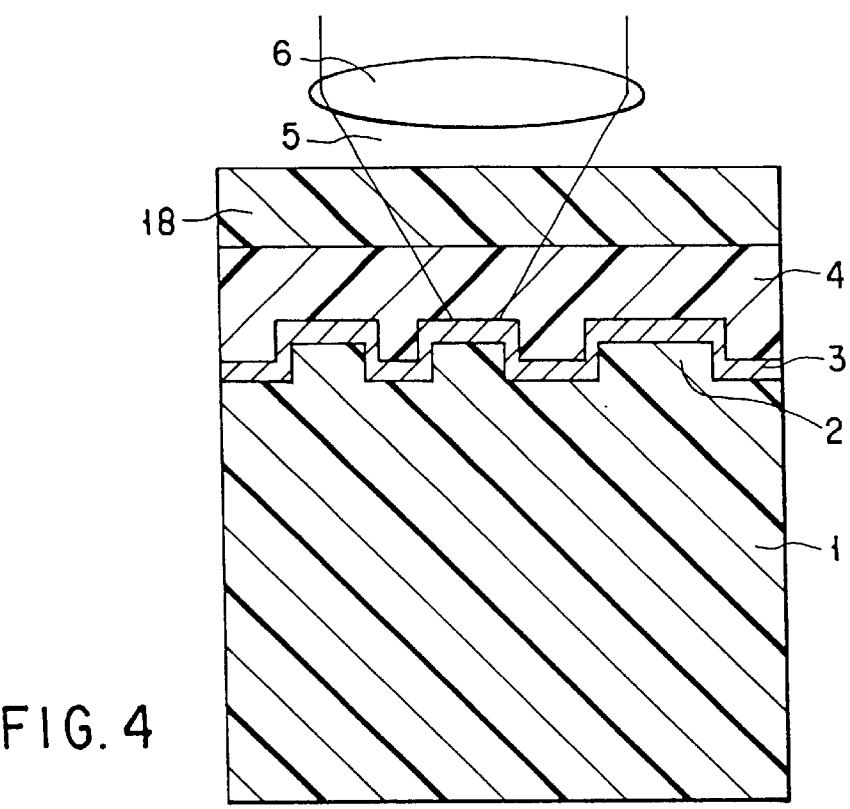
FIG. 4 is a cross-sectional view schematically showing another example of an information recording medium according to this invention.

FIG. 4 is a cross-sectional view schematically showing one example of an optical disk according to this example. In the optical disk shown in FIG. 4, one of the surfaces of a disk substrate 1 having a thickness of 1.2 mm is formed into a recording surface on which emboss pits 2 are formed in conformity with a recorded data. The surface of this recording surface provided with the emboss pits 2 is covered by a reflective film 3, and then cover-coated with a first protective film 4 and a second protective film 18 in the mentioned order. In the case of the optical disk shown in FIG. 4, the surface of the second protective film 18 is the light incident surface.

The readout of the recorded data stored in the disk can be performed as follows. Namely, as shown in FIG. 4, a light beam 5 is converged by an objective lens 6 and then enters through the second protective film 18. The light beam is then reflected by the reflective film 3, thus producing a light reflection accompanying changes in light intensity, which are then detected as recorded data of the emboss pits.

The disk substrate 1 having a thickness of 1.2 mm, the emboss pits 2, the reflective film 3 and the first protective film 4 all constituting the optical disk of this example can be constructed in the same manner as those of the aforementioned optical disk of Example 1.

The second protective film 18 to be placed on the surface of the first protective film 4 can be formed by making use of a conventional ultraviolet-curing resin for instance. Namely, an ultraviolet-curing resin for instance is at first coated on the surface of the first protective film 4 by means of a spin coating method thereby to form a resin film, and then irradiated with ultraviolet rays thereby to cure the resin film, thus forming the second protective film 18. The thickness of this over-coating second protective film 18 may be in the range of from several microns to several millimeters in practical view point. More preferably, the thickness of this over-coating second protective film 18 should be not more than 0.6 mm. Further, in view of the film thickness distribution of the ultraviolet-curing resin that will be obtained by means of a spin-coating method, the thickness of this over-coating second protective film 18 should preferably be in the range of 0.0001 to 0.1 mm in practical view-point. Additionally, the thickness of the second protective film 18 should preferably be such that does not optically interfere with the reflective film 3.

As for the material for the second protective film 18, it is not restricted to ultraviolet-curing resins, but may be any material as long as it is capable of allowing a light beam for the reproduction of data to be transmitted therethrough and is stable environmentally and thermally. For example, the second protective film 18 may be constituted by a dielectric material. More specifically, the second protective film 18 may be formed by means of a vacuum deposition method or a sputtering method employing $SiO_2$, SiO, AlN, $Al_2O_3$, $ZrO_2$, $TiO_2$, $Ta_2O_3$, ZnS, Si, Ge or a mixture thereof.

Further, this second protective film 18 is not limited to the aforementioned materials and to the aforementioned film-forming method, but may be made from any materials which are transparent to the wavelength of light to be employed. For example, a film-like or a plate-like transparent resin having a thickness ranging from 0.0001 mm to 0.6 mm may be employed. These resin film or plate may be placed on the first protective film 4 at the occasion of spin-coating the first protective film 4, and then UV-irradiated and cured in a UV furnace, thus causing the resin film or plate to be adhered onto the first protective film 4.

However, the refractive index of the second protective film 18 and the refractive index of the first protective film 4 should be suitably selected to meet the following relationship. Specifically, the refractive index $n_2$ of the second protective film 18 at the wavelength of the light beam to be employed for the reproduction of data is required to be larger than or equivalent to the refractive index $n_1$ of the first protective film 4 at the wavelength of the light beam to be employed for the reproduction of data. If the refractive index of the second protective film 18 is smaller than the refractive index of the first protective film 4 ($n_1 > n_2$), the light reflection at the interface between the second protective film 18 and the first protective film 4 becomes larger, whereby the signal from the recording surface is deteriorated and the light efficiency is caused to deteriorate.

Accordingly, in the case where the optical disk is constituted by a 2-ply structure of protective films as shown in FIG. 4, the second protective film 18 is required to be formed of a transparent material having a refractive index $n_2$ which is larger than or equivalent to the refractive index $n_1$ of the first protective film 4.

According to the optical disk of this example, since the first protective film 4 is covered by the second protective film 18, it becomes possible not only to enhance the mechanical strength of the surface of the disk, but also to prevent the surface of the disk from being damaged during the handling of the disk.

EXAMPLE 3

Figure 5:
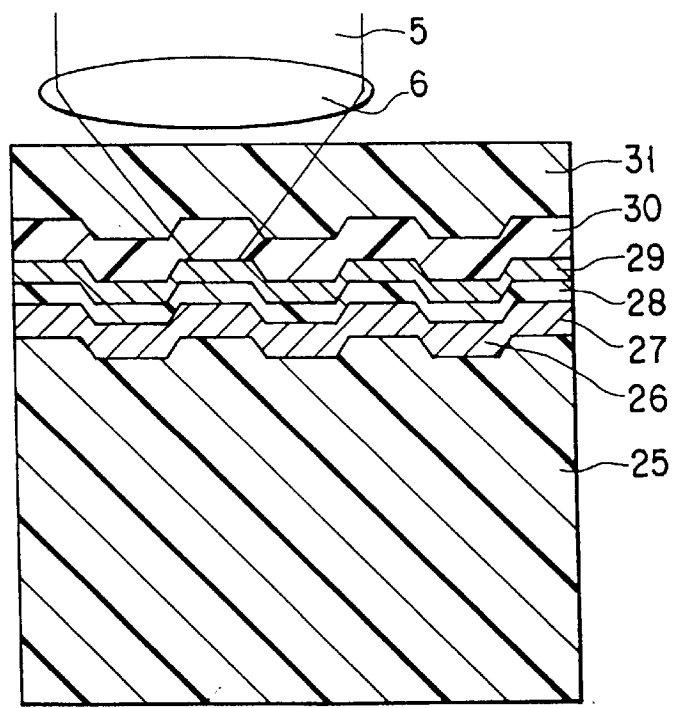
FIG. 5 is a schematic view of a die for forming a disk substrate to be employed for the manufacture of the information recording medium shown in FIG. 4.

FIG. 5 is a cross-sectional view schematically showing one example of an optical disk according to this example. In the optical disk shown in FIG. 4, one of the surfaces of a disk substrate 25 having a thickness of 1.2 mm is provided with guiding grooves 26 to be used for the tracking of light beam 5. On this guiding grooves 26 are further formed a reflective film 27, a first protective film 28 constituting a lower protective film, a recording film 29, and a second protective film 30 constituting a upper protective film in the mentioned order. The surface of this second protective film 30 is further over-coated by a third protective film 31. In the case of the optical disk shown in FIG. 5, the surface of the third protective film 31 is the light incident surface.

The readout of the recorded data stored in the disk can be performed as follows. Namely, as shown in FIG. 5, a light beam 5 is converged by an objective lens 6 and then enters through the third protective film 31. The light beam is then reflected by the reflective film 3, thus producing a light reflection accompanying changes in light intensity due to the recording marks, the changes of which are then detected as recorded data.

This disk substrate 25 can be constituted by a material which is stable and minimal in change with time. Examples of specific useful materials are acrylic resin such as polymethylmethacrylate (PMMA), polycarbonate resin, epoxy resin, styrene resin, glass, a metal such as Al, an alloy and ceramics. The surface of the optical disk substrate 25 constructed with any of these materials is then provided with groove tracks, land tracks, preformat marks, etc. depending on a recording format.

The reflective film 27 has not only the effect of optically enhancing the optical changes of the recording film 29 to be formed via the lower protective film 28 on the reflective film 27 thereby to enhance the reproducing signal, but also the effect of cooling the recording film 29. The reflective film 27 can be formed by depositing, by means of vacuum deposition method or a sputtering method, a metallic material such as Au, Al, Cu, Ni—Cr or an alloy containing any of these material as a main component. The film thickness of the reflective film 27 may be several nanometers to several micrometers in practical viewpoint.

The recording film 29 can be constituted by a phase-changing material whose crystal structure is adapted to be changed by the condition of irradiating a light beam. Examples of this phase-changing type material are chalcogenide type amorphous semiconductor materials such as GeTe type, TeSe type, GeSbSe type, $TeO_x$ type, InSe type and GeSbTe type amorphous semiconductor materials and compound semiconductor material such as InSb type, GaSb type and InSbTe type compound semiconductor materials. The recording film 29 can be formed by means of a vacuum deposition method or a sputtering method employing above materials. The film thickness of the recording film 29 may be several nanometers to several micrometers in practical viewpoint.

The lower protective film 28 and the upper protective film 30 are laminated with the recording film 29 being interposed therebetween, thereby functioning to prevent the recording film 29 from being dispersed or holed due to the irradiation of a recording beam. The lower protective film 28 and the upper protective film 30 are also effective in controlling the heat diffusion in the heating and cooling of the recording film 29 at the occasion of recording. These lower protective film 28 and upper protective film 30 can be formed by means of a vacuum deposition method or a sputtering method employing $SiO_2$, SiO, AlN, $Al_2O_3$, $ZrO_2$, $TiO_2$, $Ta_2O_3$, ZnS, Si, Ge or a mixture thereof. The film thickness of these lower protective film 28 and upper protective film 30 may be several nanometers to several micrometers in practical viewpoint.

The over-coating protective film (third protective film) 31 to be formed on the surface of this upper protective film (second protective film) 30 is provided for the purpose of preventing the phase-changing optical disk from being contaminated during the handling of the optical disk, and can be normally formed using a ultraviolet-curing resin. Namely, an ultraviolet-curing resin for instance is at first coated on the surface of the upper protective film 30 by means of a spin coating method thereby to form a resin film, and then irradiated with ultraviolet rays thereby to cure the resin film, thus forming the over-coating protective film 31.

The thickness of this over-coating protective film 31 may be in the range of from several microns to several millimeters in practical view point. More preferably, the thickness of this over-coating protective film 31 should be not more than 0.6 mm. On the other hand, the lower limit in thickness of the third protective film 31 should preferably be $5\lambda/(4n)$ or more (wherein $\lambda$ is a wavelength of the light beam; and n is a refractive index of the third protective film to a light having a wavelength of $\lambda$). If the film thickness of the third protective film 31 is less than $5\lambda/(4n)$, it becomes difficult to reproducing the recorded data normally, since a multi-interfering effect of the light beam tends to occur. Further, in view of the film thickness distribution of the ultraviolet-curing resin that will be obtained by means of a spin-coating method, the thickness of this over-coating protective film 31 should preferably be in the range of 0.0001 to 0.1 mm in practical viewpoint. Additionally, the thickness of the over-coating protective film 31 should preferably be such that does not optically interfere with the reflective film 27.

In the foregoing explanation, a phase-changing recording medium constituted by a 4-ply structure has been explained as one example. However, each layer may be formed of a multi-layer depending on the performance to be demanded.

For example, a fourth protective film may be formed on the protective film 31, thereby making the surface of the optical disk into a 2-ply protective film structure. This structure is effective in enhancing the mechanical strength of the surface of the optical disk and in preventing the optical disk from being damaged during the handling of the optical disk.

However, the refractive index of the fourth protective film and the refractive index of the third protective film 31 should be suitably selected to meet the following relationship. Specifically, the refractive index $n_4$ of the fourth protective film at the wavelength of the light beam to be employed for the reproduction of data is required to be larger than or equivalent to the refractive index $n_3$ of the third protective film 31 at the wavelength of the light beam to be employed for the reproduction of data. If the refractive index of the fourth protective film is smaller than the refractive index of the third protective film 31 ($n_3 > n_4$), the light reflection at the interface between the fourth protective film and the third protective film 31 becomes larger, whereby the signal from the recording surface is deteriorated and the light efficiency is caused to deteriorate.

Accordingly, in the case where the optical disk is constituted by a 2-ply structure of protective films, the fourth protective film constituting an outermost surface is required to be formed of a transparent material having a refractive index $n_4$ which is larger than or equivalent to the refractive index $n_3$ of the third protective film 31.

EXAMPLE 4

Figure 6:
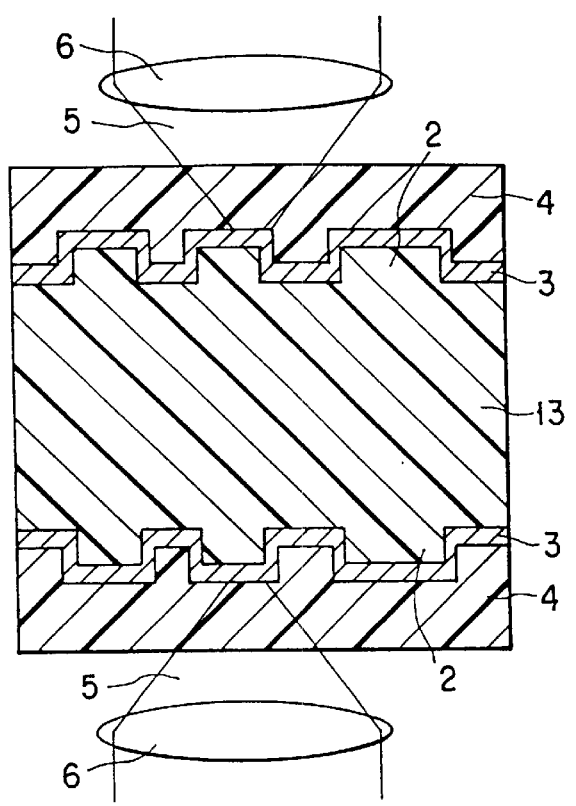
FIG. 6 is a cross-sectional view schematically showing still another example of an information recording medium according to this invention.

FIG. 6 is a cross-sectional view schematically showing one example of an optical disk according to this example. In the optical disk shown in FIG. 6, both top and back surfaces of a disk substrate 13 having a thickness of 1.2 mm are formed into a recording surface on which emboss pits 2 are formed in conformity with a recorded data. Each surface of these recording surfaces provided with the emboss pits 2 are covered by a reflective film 3, and then cover-coated with a protective film 4. In the case of the optical disk shown in FIG. 6, the surfaces of this couple of the protective films 4 constitute individually the light incident surfaces.

The readout of the recorded data stored in the disk can be performed as follows. Namely, as shown in FIG. 6, a light beam 5 is converged by an objective lens 6 and then enters through both of the protective films 4. The light beam is then reflected by the reflective film 3, thus producing a light reflection accompanying changes in light intensity, which are then detected as recorded data of the emboss pits. Since the recording surface is formed on both surfaces of the optical disk according to this example, the reproduction of data can be effected from both surfaces, thereby making it possible to secure a recording capacity which is twice as large as that of the single recording surface.

Figure 7:
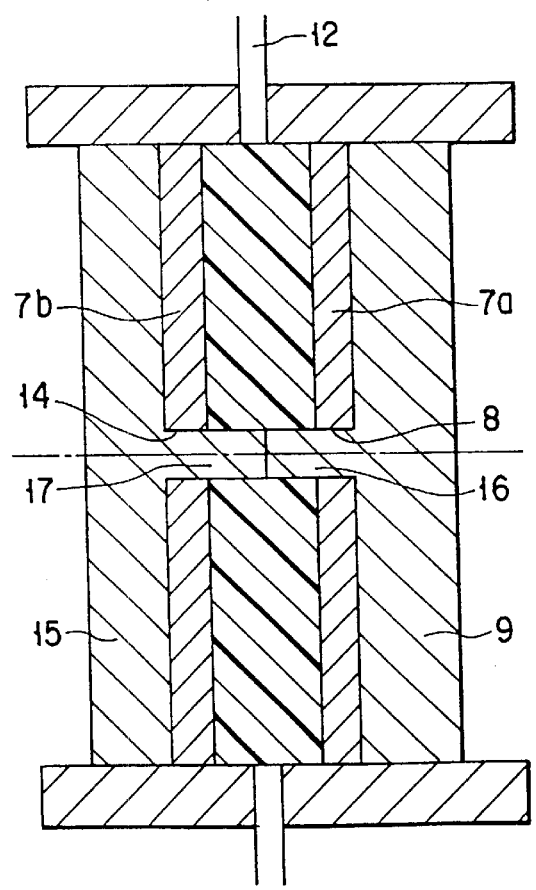
FIG. 7 is a cross-sectional view schematically showing still another example of an information recording medium according to this invention.

FIG. 7 shows schematically one example of a mold to be employed for injection-molding a disk substrate 13 to be employed for manufacturing the optical disk of this example and having a thickness of 1.2 mm and a recording surface on both sides thereof.

If it is designated that one of the surface of the disk is an A surface, and the other surface is a B surface, a stamper 7a for the A surface and a stamper 7b for the B surface are respectively manufactured at first by making use of a conventional mastering. Then, a central hole 8 is accurately formed at the center of the stamper 7a for the A surface. Likewise, a central hole 14 is accurately formed at the center of the stamper 7b for the B surface.

A projection 16 having a diameter corresponding to the central hole 8 of the stamper 7a for the A surface is formed at the central portion of the inner surface of the mold 9. Likewise, a projection 17 having a diameter corresponding to the central hole 14 of the stamper 7b for the B surface is formed at the central portion of the inner surface of the mold 15. By providing these projections 16 and 17, the central hole 8 of the stamper 7a for the A surface can be accurately aligned with the central hole 14 of the stamper 7b for the B surface.

Then, the stamper 7a for the A surface is mounted on the inner surface of the mold 9 for injection molding in such a manner that the recording surface of the stamper 7a is directed inside and the projection 16 of the mold 9 is inserted into the central hole 8 of the stamper 7a for the A surface. Likewise, the stamper 7b for the B surface is mounted on the inner surface of the mold 15 disposed to face the mold 9 in such a manner that the recording surface of the stamper 7b is directed inside and the projection 17 of the mold 15 is inserted into the central hole 14 of the stamper 7b for the B surface. Under the condition where these projections 16 and 17 are inserted into the central holes 8 and 14 of the stampers, respectively, the central hole 8 of the stamper 7a for the A surface is adjusted to accurately align with the central hole 14 of the stamper 7b for the B surface.

Then, under the condition where the recording surface of the stamper 7a for the A surface is disposed to face the recording surface of the stamper 7b for the B surface, a heated and molten resin is introduced from the resin inlet port 12 into the space between these recording surfaces. Thereafter, either the stamper 7a for the A surface or the stamper 7b for the B surface is moved forward thereby to adjust the interval between the stamper 7a for the A surface and the stamper 7b for the B surface to a predetermined size. Specifically, the interval between the stamper 7a for the A surface and the stamper 7b for the B surface is set to such that the thickness of the substrate after the cooling or curing thereof becomes 1.2 mm.

As a result of the aforementioned process, a disk substrate 13 having a thickness of 1.2 mm and provided with recording surfaces on both sides thereof can be molded by a single injection molding step.

The deposition of the reflective film 3 on these recording surfaces can be performed by depositing a material for the reflection film by means of a vacuum deposition method or a sputtering method. More specifically, an evaporation source or a sputtering target material is placed on both sides of the disk, thereby positioning a pair of evaporation sources or sputtering target materials so as to face each other. Then, the evaporation sources or sputtering target materials are allowed to evaporate or sputter, thereby simultaneously depositing a pair of reflective films on both recording surfaces. Alternatively, it is also possible to mask one of the recording surfaces with a masking material and to perform the aforementioned deposition, and thereafter, the same procedures are repeated, thereby successively performing the deposition of the reflective film one by one.

The over-coating of the protective film 4 can be performed by a process wherein a masking material is applied at first to one of the reflective film 3, a UV-curing resin is spin-coated on this one of the reflective film 3, a UV-curing resin is then spin-coated on the other one of the reflective film 3 in the same manner, then the resultant resin films are cured in a UV furnace, thus forming the protective film 4. Alternatively, the over-coating of the protective film 4 can be performed simultaneously on both reflective films 3. In this case, the disk should be rotatably supported on a suitable tool and then a UV-curing resin is applied through spin-coating to both sides of the disk thereby to form a resin film on the reflective films 3. The resultant resin films on the reflective films 3 are then allowed to pass through a pair of facing UV lamps provided in a UV furnace thereby to cure the resin films. By the utilization of this process, the over-coating of protective films 4 can be performed simultaneously on both reflective films 3.

EXAMPLE 5

Figure 8:
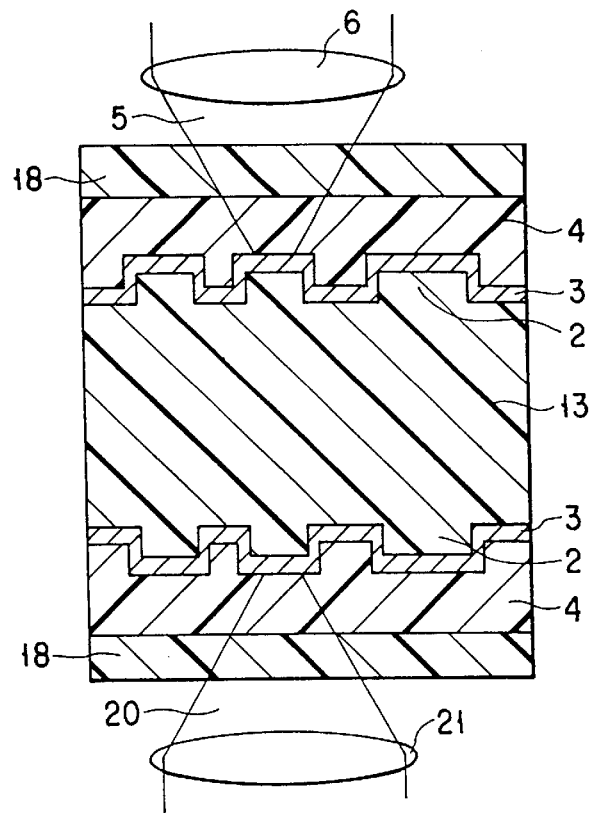
FIG. 8 is a cross-sectional view schematically showing still another example of an information recording medium according to this invention.

FIG. 8 is a cross-sectional view schematically showing one example of an optical disk according to this example. In the optical disk shown in FIG. 8, both top and back surfaces of a disk substrate 13 having a thickness of 1.2 mm are formed into a recording surface on which emboss pits 2 are formed in conformity with a recorded data. The surfaces of these recording surfaces provided with the emboss pits 2 are covered respectively by a reflective film 3, by a first protective film 4 and a second protective film 18. In the case of the optical disk shown in FIG. 8, the surfaces of this couple of the second protective films 18 constitute individually the light incident surface.

The structure of the optical disk according to this example is the same as that of Example 2 except that the recording surface and other films are formed on both surface of the disk substrate. Therefore, the disk substrate 13 having a thickness of 1.2 mm and constituting the optical disk of this example can be constructed in the same manner as explained in Example 4, and other components such as emboss pits 2, reflective film 3, first protective film 4 and second protective film 18 can be constructed in the same manner as explained in Example 1.

The readout of the recorded data stored in the disk can be performed as follows. Namely, as shown in FIG. 8, a pair of light beams 5 and 20 are converged by objective lens 6 and 21, respectively, and then allowed to enter through the second protective films 18 disposed on both sides of the disk. The light beams are then reflected by the reflective film 3, thus producing a light reflection accompanying changes in light intensity, which are then detected as recorded data of the emboss pits. Since the recording surface is formed on both surfaces of the optical disk according to this example, the reproduction of data can be effected from both surfaces, thereby making it possible to secure a recording capacity which is twice as large as that of the single recording surface.

The second protective film 18 to be placed on the surface of the first protective film 4 can be formed by making use of a conventional ultraviolet-curing resin for instance. Namely, an ultraviolet-curing resin for instance is at first coated on the surface of the first protective film 4 by means of a spin coating method thereby to form a resin film, and then irradiated with ultraviolet rays thereby to cure the resin film, thus forming the second protective film 18.

This couple of the second protective film 18 can be formed one after another or concurrently on both surfaces of the disk. Namely, if the second protective film 18 is to be formed one after another on both surfaces of the disk, a masking material is applied at first onto one of the first protective film, and then a UV-curing resin is spin-coated on this one of the first protective film. Then, the same procedures as mentioned above are repeated on the other one of the first protective film, thereby forming a couple of resin films. Thereafter, the resultant resin films are cured in a UV furnace, thus easily forming the second protective film 18. On the other hand, if a couple of the second protective films 18 are to be formed simultaneously on both first protective films 4, the following procedures can be employed. In this case, the disk should be rotatably supported on a suitable tool and then a UV-curing resin is applied through spin-coating to both sides of the disk thereby to form a resin film on both first protective films 4. The resultant resin films on both first protective films 4 are then allowed to pass through a pair of facing UV lamps provided in a UV furnace thereby to cure the resin films. By the utilization of this process, the over-coating of the second protective film 18 can be performed simultaneously on both first protective films 4.

The thickness of this over-coating second protective film 18 may be in the range of from several microns to several millimeters in practical view point. More preferably, the thickness of this over-coating second protective film 18 should be not more than 0.6 mm. Further, in view of the film thickness distribution of the ultraviolet-curing resin that will be obtained by means of a spin-coating method, the thickness of this over-coating second protective film 18 should preferably be in the range of 0.0001 to 0.1 mm in practical viewpoint. Additionally, the thickness of the second protective film 18 should preferably be such that does not optically interfere with the reflective film 3.

As for the material for the second protective film 18, it is not restricted to ultraviolet-curing resins, but may be any material as long as it is capable of allowing a light beam for the reproduction of data to be transmitted therethrough and is stable environmentally and thermally. For example, the second protective film 18 may be constituted by a dielectric material. More specifically, the second protective film 18 may be formed by means of a vacuum deposition method or a sputtering method employing $SiO_2$, $SiO$, $AlN$, $Al_2O_3$, $ZrO_2$, $TiO_2$, $Ta_2O_3$, $ZnS$, $Si$, $Ge$ or a mixture thereof.

If the second protective film 18 is to be simultaneously formed on both of the first protective films 4 by making use of these materials, an evaporation source or a sputtering target material is placed on both sides of the disk, thereby positioning a pair of evaporation sources or sputtering target materials so as to face each other. Then, the evaporation sources or sputtering target materials are allowed to evaporate or sputter, thereby simultaneously depositing a pair of the second protective films 18 on both of the first protective films 4, respectively. Alternatively, it is also possible to mask one of the first protective films 4 with a masking material and to perform the deposition of the second protective films 18, and thereafter the same procedures as mentioned above are repeated, thereby successively performing the deposition of the reflective film one by one.

Further, this second protective film 18 is not limited to the aforementioned materials and to the aforementioned film-forming method, but may be made from any materials which are transparent to the wavelength of light to be employed. For example, a film-like or a plate-like transparent resin having a thickness ranging from 0.0001 mm to 0.6 mm may be employed. These resin film or plate may be placed on the first protective film 4 at the occasion of spin-coating the first protective film 4, and then UV-irradiated and cured in a UV furnace, thus causing the resin film or plate to be adhered onto the first protective film 4.

If it is desired to form the second protective film 18 by adhering the aforementioned resin film onto the first protective film 4, a masking material is applied at first onto one of the surfaces of the reflective film, and then a UV-curing resin is coated on the other surface of the reflective film. Then, the same procedures as mentioned above are repeated on the other surface of the reflective film, thereby forming a couple of resin films for constituting the first protective films 4. Thereafter, a material for the second protective film 18 is spin-coated on these resin films and then cured in a UV furnace, thereby easily forming the second protective films 18. The second protective films 18 may be formed concurrently. In this case, the disk should be rotatably supported on a suitable tool and then a UV-curing resin is applied through spin-coating to both sides of the disk thereby to form a resin film on both first protective films 4. The resultant resin films on both first protective films 4 are then allowed to pass through a pair of facing UV lamps provided in a UV furnace thereby to cure the resin films, thus concurrently forming the second protective films 18.

If the thickness of the protective film 18 formed on both sides of the disk is set to correspond with the operating distance of the light beam, and at the same time, if this couple of protective films disposed on both top and back surfaces of the disk are made identical in thickness thereof with each other, the recorded data on both surfaces of the disk can be reproduced by making use of an optical head having an identical operation distance.

However, because of the same reason as explained in the aforementioned Example 2, when an optical disk is constituted by a 2-ply lamination structure of protective film as shown in FIG. 8, the second protective film 18 should be formed using a transparent material having a refractive index $n_2$ which is larger than or equivalent to the refractive index $n_1$ of the first protective film 4.

The optical disk according to this example is constructed such that the second protective film 18 is further laminated on each of the first protective films 4 formed on both sides of the disk. In the case of Example 3, the recording surface is formed only one surface of the disk, i.e. a single recording type. Whereas, in this example, the recording surface is formed also on the other side of the disk, thus making it into a double recording type.

Since the optical disk is made into a double recording type, it is possible to secure a recording capacity which is twice as large as that of the optical disk of single recording type.

According to the optical disk of this example, since both of the first protective films 4 are respectively covered by the second protective film 18, it becomes possible not only to enhance the mechanical strength of both surfaces of the disk, but also to prevent both surfaces of the disk from being damaged during the handling of the disk.

EXAMPLE 6

The film thickness of the couple of second protective films 18 formed on both sides of the disk shown in Example 5 may be modified to become different from each other.

For example, in the optical disk shown in FIG. 8, the film thickness of one of the second protective films 18 is set to in the range of 0.0001 to 0.6 mm, while the film thickness of the other second protective film 18 is set to 0.6 mm. As a result, the following advantages can be obtained. Namely, the surface on one of the protective films 18 that is thinner in film thickness can be employed as a data-reproducing surface for an optical head having a shorter operating distance, while the surface on the other protective film 18 that is larger in film thickness can be employed as a data-reproducing surface for an optical head formed in conformity with the conventional DVD specification.

EXAMPLE 7

The thickness of the entire disk shown in Example 6 may be set to 1.2 mm by further adjusting the thickness of the substrate 13.

For example, when the film thickness of one of the second protective films 18 is set to 0.1 mm, while the film thickness of the other second protective film 18 is set to 0.6 mm in the optical disk shown in FIG. 8, the thickness of the entire disk can be made into 1.2 mm by setting the thickness of the disk substrate 13 to 0.5 mm. As a result, the thickness of the optical disk can be made equivalent to that of the conventional CD and DVD, so that the compatibility in the handling of disk can be secured.

EXAMPLE 8

Figure 9:
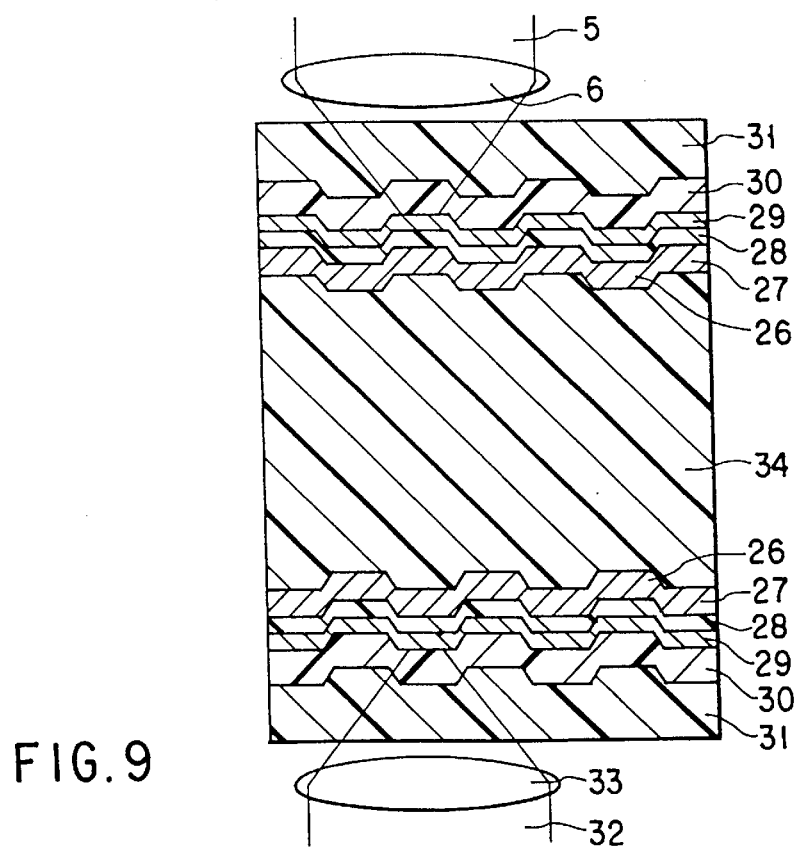
FIG. 9 is a cross-sectional view schematically showing still another example of an information recording medium according to this invention.

FIG. 9 is a cross-sectional view schematically showing one example of an optical disk according to this example.

In the optical disk shown in FIG. 9, both top and back surfaces of a disk substrate 34 having a thickness of 1.2 mm are provided with guiding grooves 26 for the tracking of the light beams 5 and 32. The surface of the guiding grooves 26 is covered by a sequence of films including, in the mentioning order, a reflective film 27, a first protective film 28 as an lower protective film, a recording film 29, and a second protective film 30 as an upper protective film. Further, a third protective film 31 is over-coated on the second protective film 30. In the case of the optical disk shown in FIG. 9, the surfaces of this couple of the third protective film 31 constitute individually the light incident surface.

The structure of the optical disk according to this example is the same as that of Example 3 except that the guiding grooves for tracking and other films are formed on both surface of the disk substrate. Therefore, the material of the disk substrate for constituting the optical disk of this example and the properties of other films are the same as those of Example 3. The formation of the reflective film, recording film and each protective film on both surfaces of the disk substrate can be performed in the same manner as explained in Example 5.

The readout of the recorded data stored in the disk can be performed as follows. Namely, as shown in FIG. 9, a pair of light beams 5 and 32 are converged by objective lens 6 and 33, respectively, and then allowed to enter through the third protective films 31 disposed on both sides of the disk. The light beams are then reflected from the recording film 29 according to the recording marks, thus producing a light reflection accompanying changes in light intensity, which are then detected as recorded data. Since the recording surface is formed on both surfaces of the optical disk according to this example, the reproduction of data can be effected from both surfaces, thereby making it possible to secure a recording capacity which is twice as large as that of the single recording surface.

The over-coating protective film (the third protective film) 31 to be formed on the upper protective film (the second protective film) 30 can be formed by making use of the same materials as employed in the aforementioned Example 3. The film thickness of the over-coating protective film 31 may be the same as that of Example 3.

In the foregoing explanation, a phase-changing recording medium constituted by a 4-ply structure has been explained as one example. However, each layer may be formed of a multi-layer depending on the performance to be demanded.

For example, a fourth protective film may be formed on the protective film 31, thereby making the surface of the optical disk into a 2-ply protective film structure. This structure is effective in enhancing the mechanical strength of the surface of the optical disk and in preventing the optical disk from being damaged during the handling of the optical disk.

However, because of the same reason as explained in the aforementioned Example 3, when the surface of the optical disk is constituted by a 2-ply lamination structure of protective film, the fourth protective film to be formed as an outermost surface should be formed using a transparent material having a refractive index $n_4$ which is larger than or equivalent to the refractive index $n_3$ of the third protective film 31.

EXAMPLE 9

A recessed/projected surface constituting a recording emboss or a tracking groove is formed inside the protective film constituting an outermost surface, or inside the disk in the optical disks explained in the aforementioned Examples 1 to 8. In this case, a specific example of the protective film constituting an outermost surface may be the first protective film 4 as shown in FIGS. 1 and 6, the second protective film 18 as shown in FIGS. 4 and 8, or the third protective film 31 as shown in FIGS. 5 and 9.

In this case, these protective films may be formed as a thick film on the outside of the disk. As a result, it becomes possible to flatten the surface without giving an effect to the recessed/projected surface formed on the inside of the disk.

EXAMPLE 10

This example illustrates a large capacity optical disk provided with a multiple information recording layer. In particular, this optical disk is a 2-ply optical disk which is designed to make it possible to read out information of a couple of information recording layers from one surface of a reproducing or recording optical disk. Namely, it is now possible, according to the 2-ply optical disk of this example, to realize a 2-ply optical disk as an optical disk that can be reproduced or recorded from the top surface, and at the same time, to improve the readout S/N of the inner recording layer, and to ensure the readout S/N of the outer recording layer, thus enabling the 2-ply optical disk to be practically employed.

Figure 10:
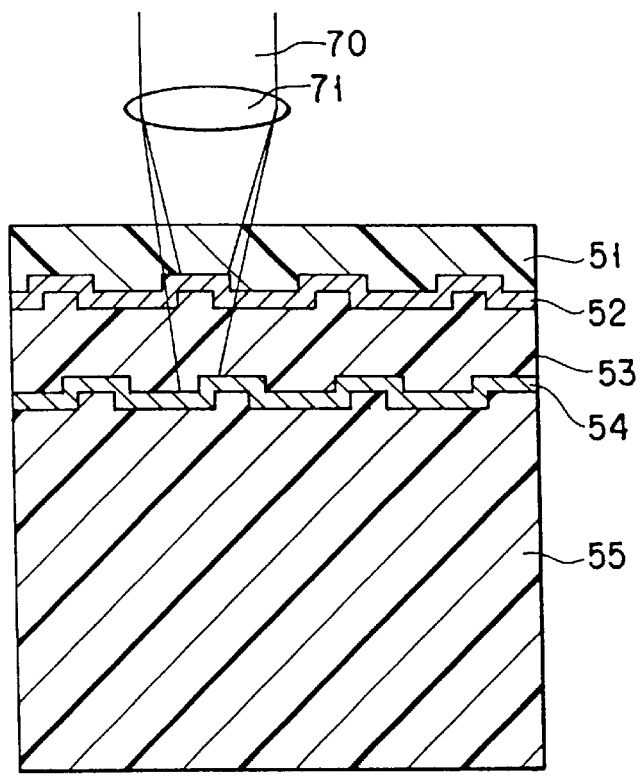
FIG. 10 is a cross-sectional view schematically showing still another example of an information recording medium according to this invention.

FIG. 10 shows a cross-sectional view schematically illustrating one example of the optical disk of this example.

The optical disk shown herein includes at least an overcoat film or surface substrate 51 provided with a light incident surface and an emboss pit surface, a first reflective film 52, a transparent adhesion layer (a spacer layer) 53, a second reflective film 54 and a supporting substrate (a core substrate) 55 provided with an emboss pit surface and a substrate surface. The dimension of this disk are; 120 mm in outer diameter, 15 mm in inner diameter (a diameter of the central hole) and 1.2 mm in thickness, wherein the thickness of the core substrate 55 is about 1.1 mm, and the thickness of the surface substrate 51 is smaller than that of the core substrate 55, i.e. about 0.001 to 0.1 mm.

A first recording surface is constituted by the emboss pit surface of the surface substrate 51 and by the first reflection film 52, while the second recording surface is constituted by the emboss pit surface of the supporting substrate 55 and by the second reflection film 54.

The readout of the recorded data stored in the disk can be performed as follows. Namely, as shown in FIG. 10, a light beam 70 is converged by an objective lens 71, then enters through the surface substrate 51, and converged at the first recording surface or the second recording surface. The light beam is then reflected by each of these recording surfaces, thus producing a light reflection accompanying changes in light intensity, which are then detected as recorded data of the emboss pits.

According to the conventional optical disk, the emboss data are designed to be read by irradiating a light beam from the core substrate side. As a result, the securing of the tilt margin is restricted depending on the thickness of the substrate. Whereas, according to the optical disk shown in FIG. 10, the data thereof is reproduced by irradiating a light beam through the surface substrate (or a covering substrate) 51. In this case, since the thickness of the covering substrate 51 is smaller than the thickness of the core substrate 55, the tilt margin is no more restricted by the thickness of the substrate, thus making it possible to further increase the recording density.

The core substrate 55 having a thickness of 1.1 mm can be manufactured by means of an injection molding method which is commonly employed for the manufacture of the conventional CD and DVD. For example, a master platen in which information is stored in advance is. mounted on one of the dies of an injection molding machine, and then an injection molding is performed after adjusting the space between a couple of dies in such a way that the thickness of the substrate after the molding thereof becomes 1.1 mm, thus manufacturing the core substrate 55 having a thickness of 1.1 mm.

On the other hand, the covering substrate 51 is very thin in thickness, i.e. about 0.1 mm in thickness. Therefore, the injection molding method which is commonly employed for the manufacture of the conventional CD and DVD can hardly be applied as it is to the manufacture of the covering substrate 51. Accordingly, according to this invention, the following method is employed for the manufacture of the covering substrate 51.

Figure 11:
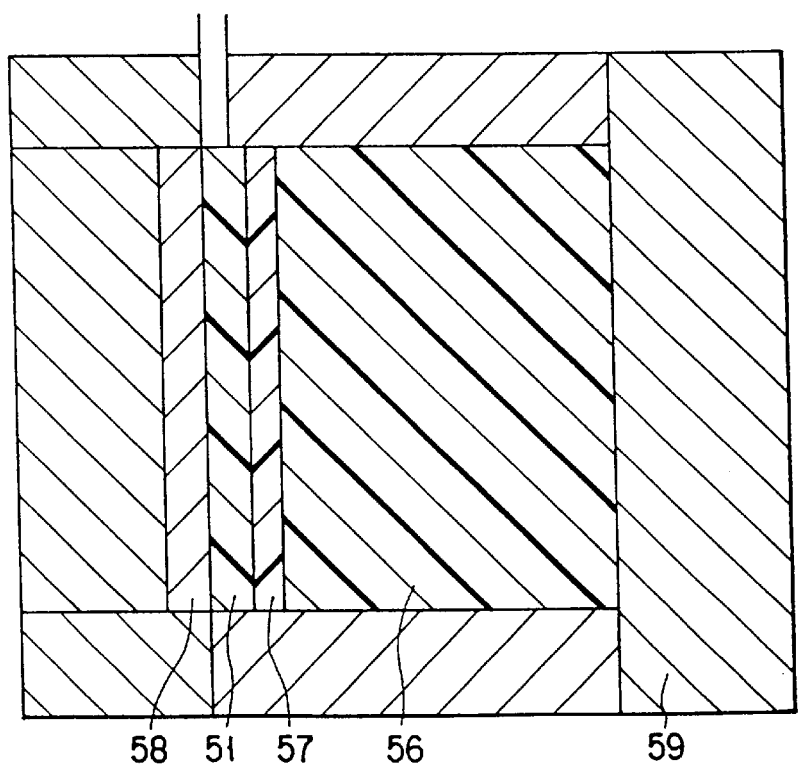
FIG. 11 is a cross-sectional view schematically showing a method of injection-molding the information recording medium shown in FIG. 10.

The injection molding method of the covering substrate 51 according to this invention will be explained with reference to FIG. 11.

First of all, a flat supporting substrate 56 is mounted on one inner side of a molding die 59, and then, a releasing agent 57 is coated on the flat supporting substrate 56. On the other hand, a master platen 58 in which a data has been stored in advance is mounted on the opposite inner side of the molding die 59 so as to rendering the master platen 58 to face the flat supporting substrate 56.

Then, the cavity space of the molding die is adjusted to such that the thickness of the covering substrate 51 becomes 0.1 mm after the molding. Thereafter, a heated and molten resin is introduced from the resin inlet port into the space between the stamper 58 of the molding die 59 and the supporting substrate 56. Then, either the surface of the stamper and the surface of the supporting substrate are pushed forward thereby to set the interval thereof to a predetermined size. Specifically, the interval between the surface of the stamper and the surface of the supporting substrate is set to such that the thickness of the covering substrate 51 after the cooling or curing thereof becomes 0.1 mm.

As a result of this injection molding, a covering substrate 51 having a thickness of 0.1 mm and bonded via the releasing agent 57 to the supporting substrate 56 can be formed.

The surfaces of both covering substrate 51 and core substrate 55 are deposited thereon with a predetermined thickness of reflective film by means of a sputtering method for instance. The deposition of the reflective film on the covering substrate 51 can be performed by mounting the covering substrate 51 on a sputtering apparatus while keeping the covering substrate 51 attached through the releasing agent 57 to the supporting substrate 56. Since the covering substrate 51 is kept sustained on the supporting substrate 56, the covering substrate 51 can be prevented from being warped during the sputtering and at the same time, the handling of the covering substrate 51 can be facilitated.

Both covering substrate 51 and core substrate 55 coated respectively with a reflective film are bonded together to each other according to the following process. Namely, FIGS. 12A to 12D illustrate the process of bonding the covering substrate 51 to the core substrate 55 after the deposition of the reflective film.

Figure 12A:
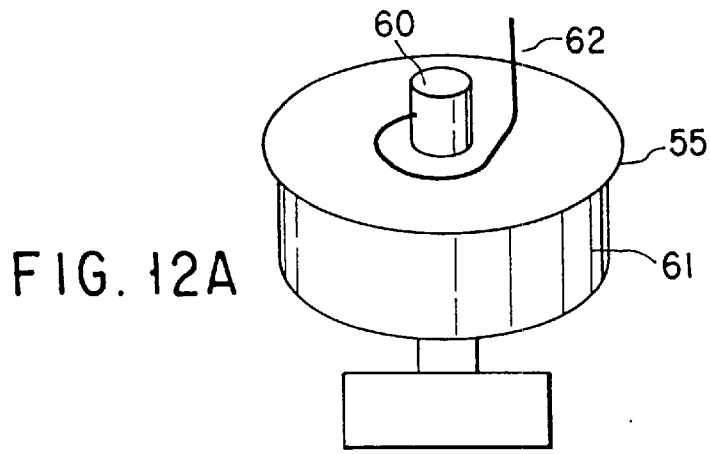
FIGS. 12A to 12D are perspective views illustrating the steps of manufacturing the information recording medium shown in FIG. 10.
Figure 12B:
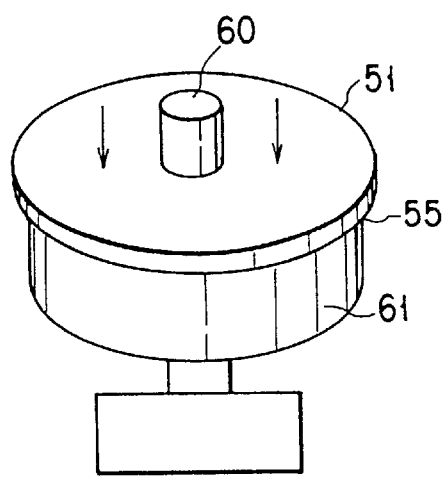

First of all, as shown in FIG. 12A, the alignment pin 60 of a spin table 61 is inserted into the central hole of the core substrate 55. In this case, the core substrate 55 is arranged with the recording surface thereof being faced upward. After the core substrate 55 is closely attached onto the spin table 61, a suitable amount of a ultraviolet-curing adhesive 62 of low viscosity is coated on the core substrate 55.

After the coating of this adhesive, the central hole of the covering substrate 51 bonded to the supporting substrate 55 is fitted with the alignment pin 60 of the spin table 61 as shown in FIG. 12A. In this case, the covering substrate 51 is arranged with the recording surface there of being faced downward. The covering substrate 51 is adhered with the core substrate 55 in such a manner that the adhesive 62 coated on the core substrate 55 is spread out by the covering substrate 51.

Figure 12C:
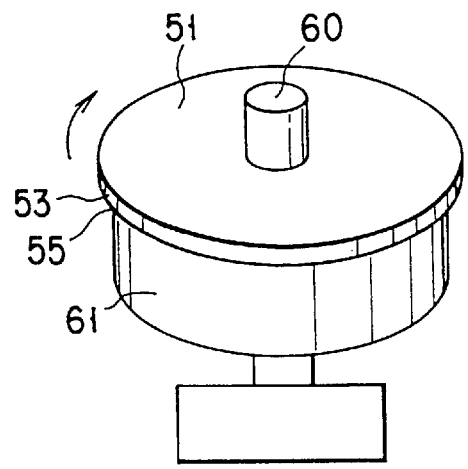

Then, as shown in FIG. 12C, after the covering substrate 51 is adhered with the core substrate 55, the spin table is caused to rotate at a high speed. The superfluous portion of the adhesive interposed between the covering substrate 51 and the core substrate 55 is splashed out due to the centrifugal force of the high speed rotation, thereby making it possible to form a uniform foamless adhesive layer 53 having a predetermined thickness between these substrates 51 and 55, thus obtaining a laminated optical disk.

Figure 12D:
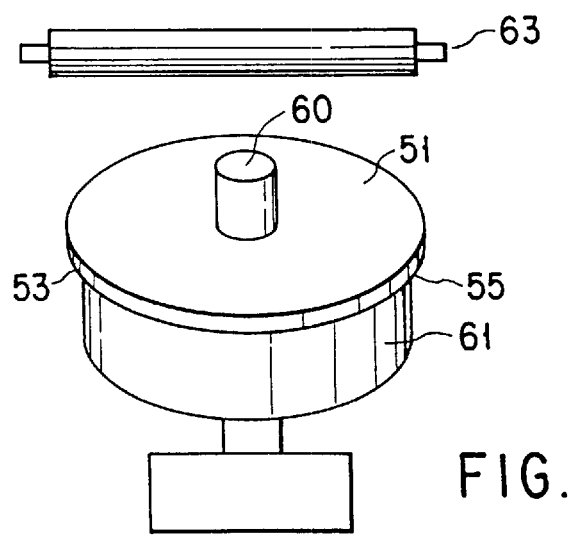

Finally, as shown in FIG. 12D, ultraviolet rays are irradiated from an ultraviolet lamp 63 onto the optical disk. As a result, the covering substrate 51 and the core substrate 55 are completely integrated.

FIG. 13 illustrates a cross-sectional view of the laminated structure of the optical disk. As shown in FIG. 13, the supporting substrate 56 is bonded via the releasing agent layer 57 to the surface of the covering substrate 51. Since the adhesive strength of the releasing agent layer 57 is suitably weakened, the releasing agent layer 57 can be easily separated together with the supporting substrate 56 from the covering substrate 51 when the supporting substrate 56 is pulled apart from the covering substrate 51. As a result, the optical disk having a structure as shown in FIG. 10 can be obtained.

The surface of the covering substrate 51, i.e. the surface roughness "R" of the light incident surface should desirably be selected to meet a relationship represented by the following formula (1) even in the case of the optical disk of this example:

$$R \leq \lambda/(8n) \tag{1}$$

wherein λ is a wavelength of the light beam; and n is a refractive index of the covering substrate to a light having the wavelength λ.

It becomes possible, by limiting the surface roughness of the light incident surface as described above thereby ensuring the flatness of the light incident surface, to minimize the light-diffracting phenomenon at the light incident surface. Additionally, if the surface of the optical disk is flat as defined above, dust can be hardly attached to the surface of the optical disk, thus improving a dust adhesion preventive effect of the optical disk. Moreover, if the surface of the optical disk is flat as defined above, it is also possible to obtain the effect that the optical disk can be prevented from being contacted with the objective lens. By the way, more preferable surface roughness of the light incident surface is not higher than a half of λ/(8n), i.e. not higher than λ/(16n)

It is possible, even in the case of the optical disk shown in FIG. 10, to employ a phase-changing type recording film. Specifically, a phase-changing type recording film composed of any of such materials as explained in the aforementioned Example 3 may be substituted for the reflective film. When the optical disk is constructed in this manner, a rewritable optical disk can be obtained.

EXAMPLE 11

According to the conventional optical disk, a recorded data is designed to be reproduced by irradiating a light beam from the substrate side, so that the substrate is required to be transparent to the wavelength of a light beam to be employed. By contrast, according to this invention, since a recorded data is reproduced by irradiating a light beam from the covering substrate side, the core substrate is not necessarily required to be transparent. Additionally, the birefringence index of the core substrate can be disregarded in this invention.

Therefore, as a material for the core substrate of this invention, any kinds of material can be employed as long as they are excellent in environment resistance, heat resistance and workability. For example, materials such as ABS resin, polyethylene resin, polystyrene resin, etc. which are inexpensive as compared with the materials employed conventionally can be employed.

EXAMPLE 12

The reflectance of the first recording surface as well as of the second recording surface can be determined respectively by the reflectance and transmittance of the first reflective layer 52 and second reflective layer 54.

FIG. 14 shows the reflectance and transmittance of each recording surface.

First of all, the reflectance and transmittance of the first recording surface are designated as $R_1$ and $T_1$, respectively, while the reflectance and transmittance of the second recording surface are designated as $R_2$ and $T_2$, respectively. When a light beam $L_0$ is irradiated from the first recording surface side, the reflected light $L_1$ of the light beam that has been focused on the first recording surface can be represented by the following formula (6).

$$L_1 = L_0 \times R_1 / 100 \quad (6)$$

On the other hand, the transmitted light LT can be represented by the following formula (7).

$$LT = L_0 \times T_1 / 100 \quad (7)$$

Further, the reflected light $L_2$ of the light beam that has been focused on the second recording surface can be represented by the following formula (8).

$$\begin{aligned} L_2 &= (LT \times R_2 / 100) \times T_1 / 100 \\ &= L_0 \times (R_2 / 100) \times (T_1 / 100)^2 \end{aligned} \quad (8)$$

In the case of the focused light to be emitted from the light head, if the interval between the first recording surface and the second recording surface is set away more or less from the focused point, the light beam is caused to scatter at the regions other than the focused recording surface. Therefore, the leaking of the light beam would be so minimal that can be practically disregarded.

In view of reproducing data from each recording surface, the substantial reflectance of laser beam on every recording surface should desirably be set to a large value. Specifically, the ratio $L_2$ of a laser beam that is reflected from the lower second recording surface and passed through the upper first recording surface thereby to return to the outside in relative to the external incident laser beam should preferably be about 15 to 45%. Likewise, the ratio $L_1$ of a laser beam that is reflected from the upper first recording surface and returned to the outside in relative to the external incident laser beam should preferably be about 15 to 45%.

This means that the servo-property (servo-gain) of the data readout optical system of an apparatus for reproducing a data from a multiple information recording medium (for example, 2-ply optical disk) may be the same irrespective of the position of the recording surface, i.e. irrespective of the upper first recording surface or the lower second recording surface. Namely, the switching of the servo-property of the data readout optical system at the occasion of changing the readout position from the upper first recording surface to the lower second recording surface (and vice versa) is no more required. Accordingly, it is possible to avoid a temporary interruption (or the generation of a temporary operationally unstable state) of the reproducing operation at the occasion of switching the readout layers. Since the switching of the servo-property of the data readout optical system is no more required, it is possible to expect various advantages that the operation of the reproducing apparatus can be further stabilized and that the cost for manufacturing the reproducing apparatus can be saved.

FIGS. 15 to 19 show graphs illustrating a relationship between the film thickness of reflective film and the reflectance with respect to various materials useful for the reflective film. The reflectance in this case is a value in relative to a light beam having a wavelength of 400 nm. The film thickness and reflectance of the reflective film were calculated under the condition wherein materials for each reflective film were coated on the substrate thereby to form a film on which a UV resin was subsequently over-coated. By the way, the transmittance was separately calculated.

FIG. 15 illustrates a case wherein SiC was employed as a material for the reflective film. The reflectance was 27% and the transmittance was 48% as the film thickness was 30 nm. Since these values are acceptable, the SiC film can be employed as a reflective layer of the first recording surface.

Figure 16:
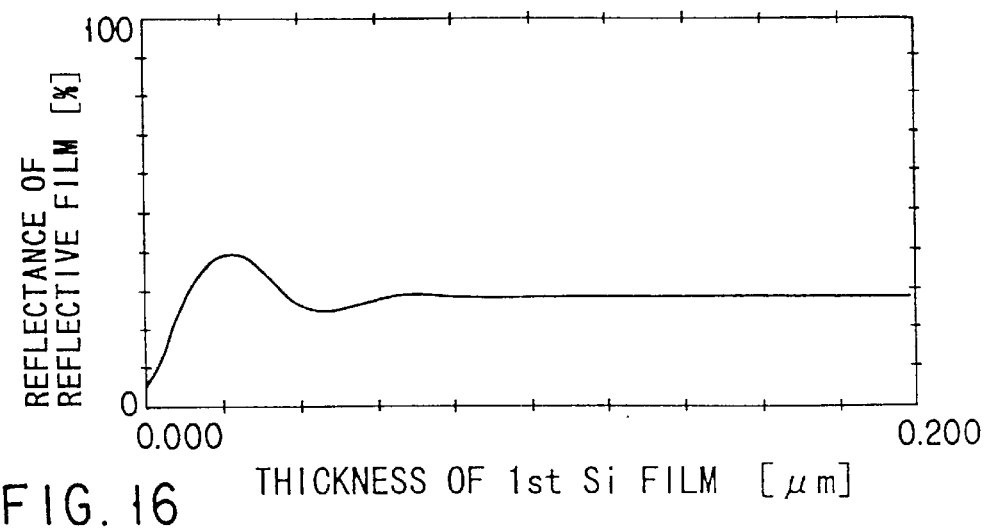
FIG. 16 is a graph showing a relationship between the film thickness and reflectance of a reflective film.

FIG. 16 illustrates a case wherein Si was employed as a material for the reflective film. The reflectance was 40% and the transmittance was 20% as the film thickness was 20 nm. Since this Si film is large in absorbency, it can be hardly employed as a reflective film of the first recording surface. However, if any other material exhibiting a high transmittance is employed as a reflective layer of the first recording surface, this Si film can be employed as a reflective film of the second recording surface.

Figure 17:
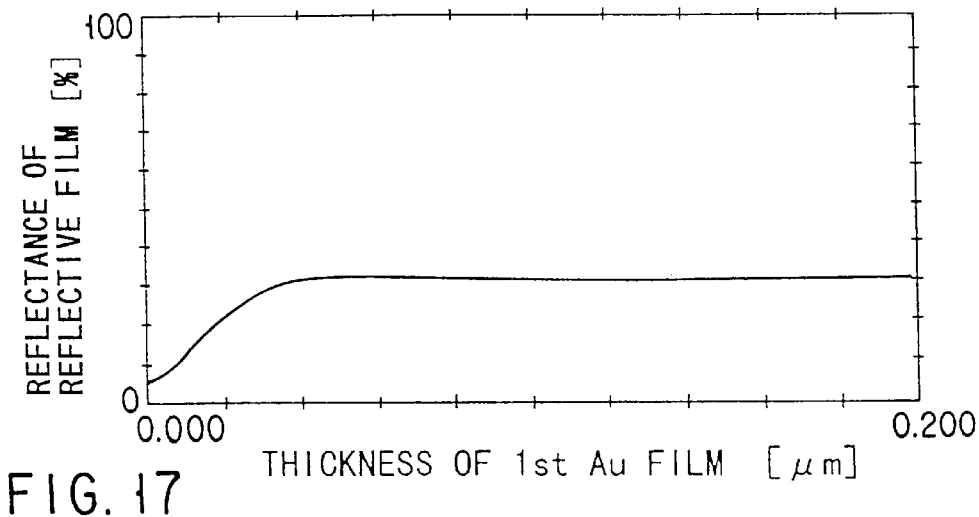
FIG. 17 is a graph showing a relationship between the film thickness and reflectance of a reflective film.

FIG. 17 illustrates a case wherein Au was employed as a material for the reflective film. The reflectance was 32% and the transmittance was 11% as the film thickness was 20 nm. Since this Au film is large in absorbency, it can be hardly employed as a reflective film of the first recording surface. However, if any other material exhibiting a high transmittance is employed as a reflective layer of the first recording surface, this Au film can be employed as a reflective film of the second recording surface.

Figure 18:
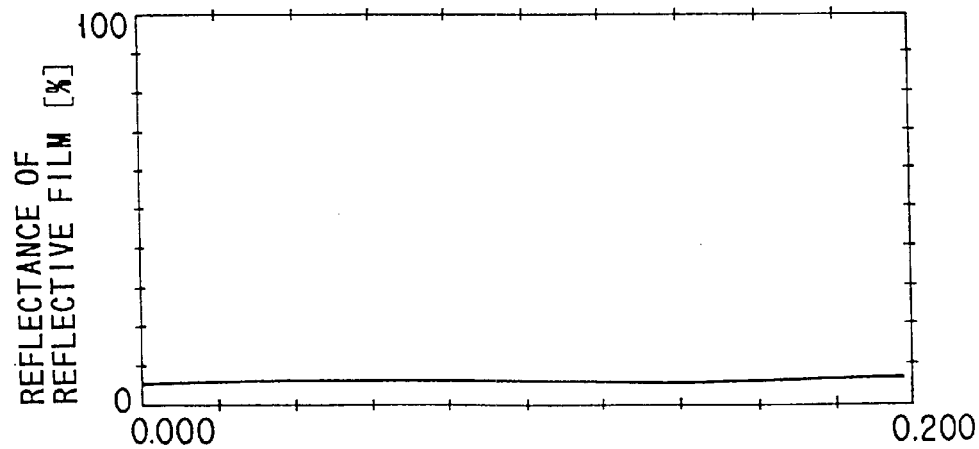
FIG. 18 is a graph showing a relationship between the film thickness and reflectance of a reflective film.

FIG. 18 illustrates a case wherein $SiO_2$ was employed as a material for the reflective film. As shown in this graph, the $SiO_2$ film is substantially transparent to the light beam of 400 nm in wavelength, so that the $SiO_2$ film can be hardly employed as a reflective film.

Figure 19:
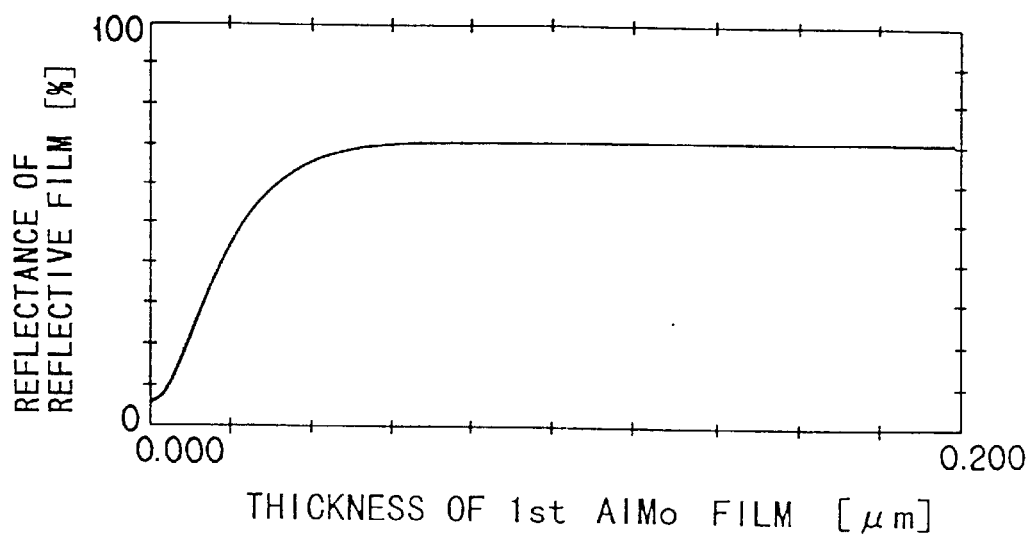
FIG. 19 is a graph showing a relationship between the film thickness and reflectance of a reflective film.

FIG. 19 illustrates a case wherein AlMo was employed as a material for the reflective film. The reflectance was 70% as the film thickness was 50 nm or more. The transmittance thereof is substantially zero. Therefore, the AlMo film is suited for use as a reflective film of the second recording surface.

In the case of this AlMo film, the reflectance was 32% and the transmittance was 11% as the film thickness was 40 nm. Since this AlMo film is large in absorbency, it can be hardly employed as a reflective film of the first recording surface. However, if any other material exhibiting a high transmittance is employed as a reflective layer of the first recording surface, this AlMo film can be employed as a reflective film of the second recording surface.

For example, when an SiC film having a film thickness of 30 nm is formed as a reflective film of the first recording surface, and an AlMo film having a film thickness of 50 nm is formed as a reflective film of the second recording surface, the reflectance $L_1$ of the first recording surface would become 27% and the reflectance $L_2$ of the second recording surface would become 16% when they are calculated according to the aforementioned formulas (6) and (8).

By the way, it is also possible to balance the reflectance of each recording surface by adjusting the film thickness of the SiC film to be formed on the surface of the first recording surface. For example, when the film thickness of this SiC film is set to 20 nm, the reflectance $L_1$ of the first recording surface can be controlled to 20%, while the reflectance $L_2$ of the second recording surface can be controlled to 36%. Further, when the film thickness of this SiC film is set to 25 nm, the reflectance $L_1$ of the first recording surface can be controlled to 23%, while the reflectance $L_2$ of the second recording surface can be controlled to 23%.

EXAMPLE 13

Figure 20A:
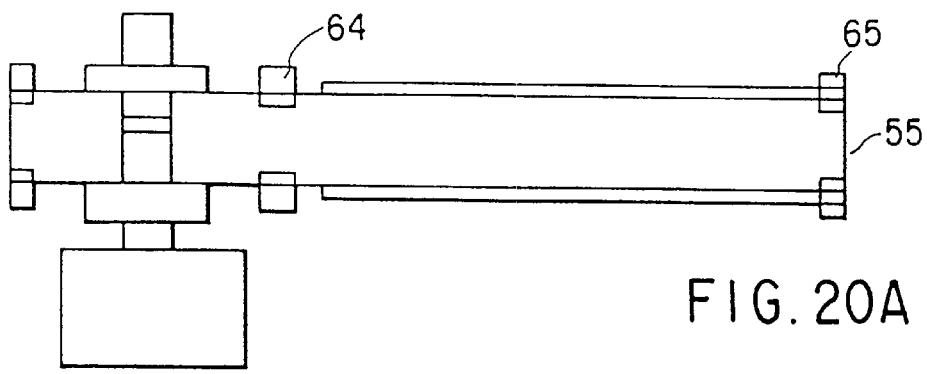
FIGS. 20A and 20B are cross-sectional views schematically showing still another example of an information recording medium according to this invention.

FIG. 20A illustrates a disk structure where the covering layer of the surface of the disk was formed using a UV over-coat film. It is effective, in view of preventing the disk from being damaged during the handling thereof, to form a recessed or projected portion 64 and 65 on the region inside or outside the recording region. The provision of such a recessed or projected portion can be performed by preliminarily forming such a recessed or projected portion 64 and 65 on the surface of the supporting substrate 55 in prior to the formation of a UV over-coat. It is possible to form such a recessed or projected portion 64 and 65 on the surface of the supporting substrate 55 by making use of a molding die or stamper provided with a corresponding recessed or projected portion at the occasion of injection-molding the supporting substrate 55.

The depth or height of the recessed or projected portion to be formed on the surface of the supporting substrate 55 may be preferably about 0.3 mm with the width thereof being about 0.2 to 10 mm in practical viewpoint.

By the way, in view of preventing any bad influence from being given to the tilt property at the occasion of clamping the disk, the over-coat film should not be applied to the clamping portion inside of the disk.

EXAMPLE 14

Figure 20B:
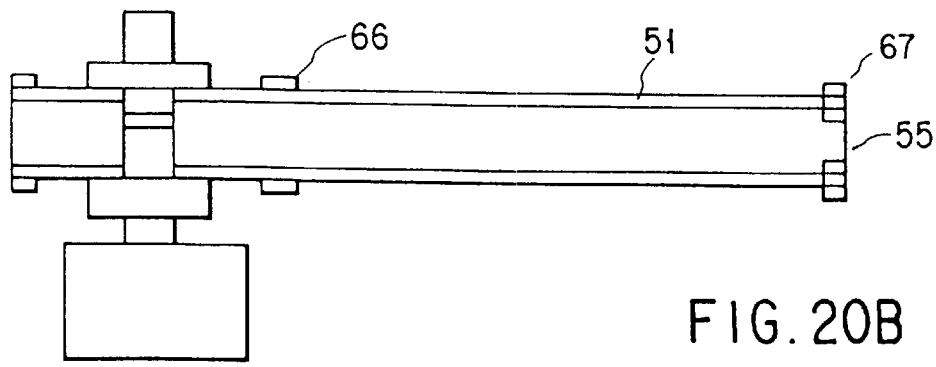

FIG. 20B illustrates a disk structure where the covering layer of the surface of the disk was formed using a protective film having a thickness of 0.1 mm. It is effective, in view of preventing the disk from being damaged during the handling thereof, to form a recessed or projected portion 66 and 67 on the region inside or outside the recording region. The provision of such a recessed or projected portion can be performed by making use of the supporting substrate 55 having a flat surface or a surface provided only recessed portions. It is possible to form such a recessed or projected portion on the surface of the supporting substrate 55 by making use of a molding die or stamper provided with a corresponding recessed or projected portion at the occasion of injection-molding the protective substrate 51.

The depth or height of the recessed or projected portion to be formed on the surface of the supporting substrate 55 may be preferably about 0.3 mm or less with the width thereof being about 0.2 to 10 mm in practical viewpoint.

In this case, the protective film 51 is formed also at the clamping portion inside of the disk. This is because, the alignment between the supporting substrate 55 and the protective substrate 51 is performed at the spindle hole. Since the thickness of the protective substrate is relatively uniform, the existence of the protective substrate at the clamping portion would not give a bad influence to the tilt property.

EXAMPLE 15

Figure 21:
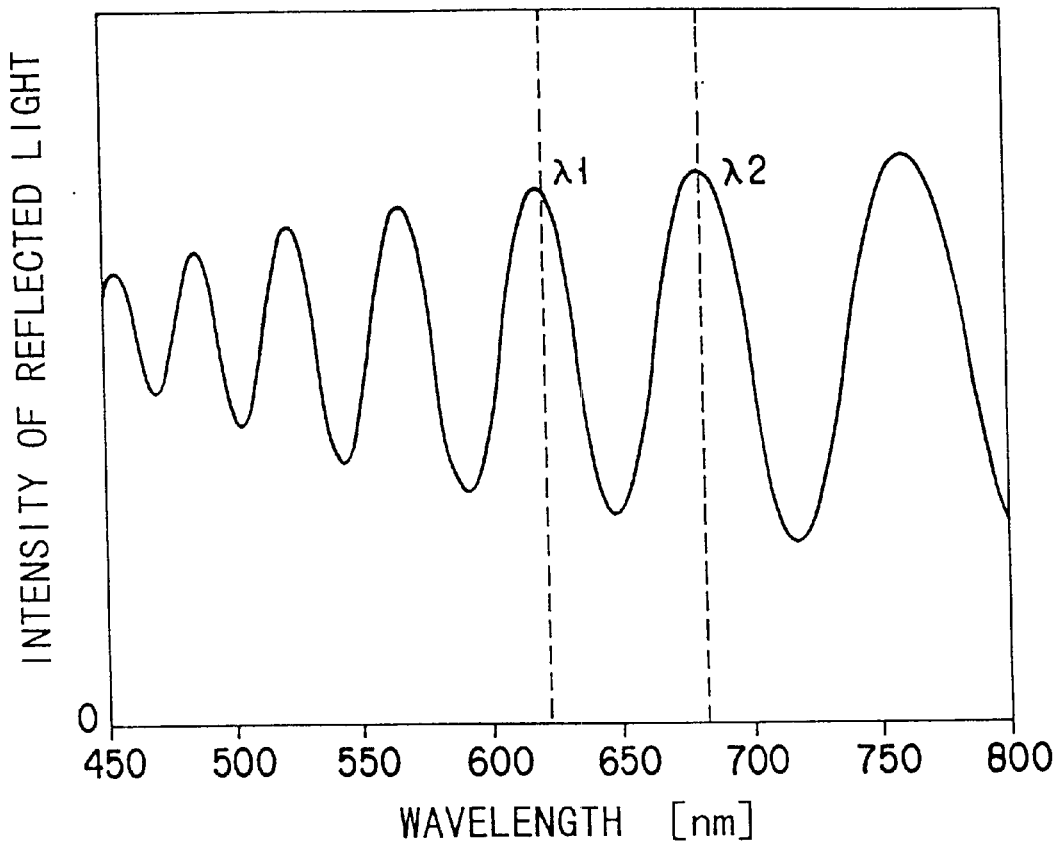
FIG. 21 is a graph illustrating a relationship between the wavelength of light beam for recording and reproducing a data and the intensity of reflected beam in a 2-ply disk.

Next, the thickness of the adhesive layer 53 of the 2-ply disk will be explained with reference to FIG. 21. FIG. 21 shows a relationship between the wavelength of light beam for recording and reproducing a data and the intensity of reflected beam.

If the refraction index of the adhesive layer 53 is designated as "n", the distance dad of the adhesive layer can be expressed by the following formula (9).

$$d_{ad} = \lambda_1 \times \lambda_2 / 2n \, (\lambda_1 - \lambda_2) \tag{9}$$

wherein $\lambda_1$ and $\lambda_2$ are neighboring wavelengths under which condition the intensity of reflected light becomes the maximum.

When the wavelength for recording/reproducing is 650 nm, the distance dad of the adhesive layer is set to about 40 µm. At this occasion, the intensity of reflected light becomes the minimum.

Since the distance $d_{ad}$ of the adhesive layer 53 is proportional to the recording/reproducing wavelength, if the recording/reproducing wavelength is assumed as being 400 nm, the distance of the adhesive layer which renders the intensity of reflected light to become the minimum is about 25 µm.

$$d_{ad} = 40 \times 400/650 = \text{about } 25 \, \mu m \tag{9}$$

Therefore, when the recording or reproducing wavelength is 400 nm, the distance of the adhesive layer should preferably be set to about 25 µm, or practically in the range of 20 to 30 µm if the non-uniformity in the manufacture thereof is taken into account.

As explained above, it is possible according to this invention to provide an information recording medium which is capable of securing a sufficient tilt margin and a sufficient mechanical strength even if the recording density is further increased. Further, this invention provides a method of manufacturing a resinous substrate which is suited for use in the manufacture of such an information recording medium.

Since a substrate which is provided on both surfaces thereof with a recording surface can be easily manufactured according to the method of this invention and hence, the bonding of a couple of substrates can be dispensed with, the manufacturing process of the optical disk can be extremely simplified. Further, since an adhesive for the bonding of the substrates is no more required to be employed, it is possible to cheaply manufacture an optical disk of large capacity.

Additionally, it is possible according to the information recording medium of this invention to secure a sufficient mechanical strength of the disk even if the surface protective film is made thinner than 0.6 mm which has been conventionally considered as a lower limit. Therefore, this invention would be very valuable in industrial viewpoint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium, which comprises:
    a substrate having a recording surface;
    a reflective layer formed on said recording surface of said substrate; and
    a protective layer formed on said reflective layer;
    wherein said recording surface of said substrate has a region in which said protective layer is not formed;

said region in which said protective layer is not formed has a projected portion; and a light beam to be irradiated is designated to be entered and reflected through said protective layer, a recorded information being reproduced based on changes in light intensity of the reflected light beam.

2. The information recording medium according to claim 1, wherein the width of said projected portion formed on said surface of said substrate is about 0.2 to 10 mm.

3. The information recording medium according to claim 2, wherein the height of said projected portion formed on said surface of said substrate is about 0.3 mm or less.

4. The information recording medium according to claim 1, wherein the thickness of said protective layer is in the range of 0.0001 to 0.6 mm.

5. An information recording medium, which comprises:

a substrate having a recording surface;

a reflective layer formed on said recording surface of said substrate; and a protective layer formed on said reflective layer;

wherein said protective layer is provided with a projected portion; and a light beam to be irradiated is designated to be entered and reflected through said protective layer, a recorded information being reproduced based on changes in light intensity of the reflected light beam.

6. The information recording medium according to claim 5, wherein the width of said projected portion formed on said surface of said substrate is about 0.2 to 10 mm.

7. The information recording medium according to claim 6, wherein the height of said projected portion formed on said surface of said substrate is about 0.3 mm or less.

8. The information recording medium according to claim 6, wherein the thickness of said protective layer is in the range of 0.0001 to 0.6 mm.

* * * * *